(12) United States Patent
Hong et al.

(10) Patent No.: US 8,831,872 B2
(45) Date of Patent: Sep. 9, 2014

(54) APPARATUS AND METHOD FOR ESTIMATING LOCATION OF MOBILE BODY AND GENERATING MAP OF MOBILE BODY ENVIRONMENT USING UPPER IMAGE OF MOBILE BODY ENVIRONMENT, AND COMPUTER READABLE RECORDING MEDIUM STORING COMPUTER PROGRAM CONTROLLING THE APPARATUS

(75) Inventors: Sungi Hong, Hwaseong-si (KR); Hyoungki Lee, Suwon-si (KR); Hyeon Myeong, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 740 days.

(21) Appl. No.: 11/331,058

(22) Filed: Jan. 13, 2006

(65) Prior Publication Data

US 2006/0165276 A1 Jul. 27, 2006

(30) Foreign Application Priority Data

Jan. 25, 2005 (KR) ................. 10-2005-0006573

(51) Int. Cl.
*G01C 21/00* (2006.01)
*G08G 1/123* (2006.01)
*G06K 9/00* (2006.01)
*G05D 1/02* (2006.01)

(52) U.S. Cl.
CPC ............ *G05D 1/0253* (2013.01); *G05D 1/0272* (2013.01); *G05D 1/0274* (2013.01)
USPC .......................... 701/409; 382/153

(58) Field of Classification Search
USPC .......................... 701/209; 382/153
See application file for complete search history.

(56) References Cited

U.S. PATENT DOCUMENTS

| 5,051,906 | A | 9/1991 | Evans, Jr. et al. ......... 364/424.02 |
| 5,793,934 | A | 8/1998 | Bauer ............................. 395/85 |
| 6,285,393 | B1 | 9/2001 | Shimoura et al. ............. 348/119 |
| 2002/0067432 | A1* | 6/2002 | Kondo et al. .................. 348/576 |

(Continued)

FOREIGN PATENT DOCUMENTS

| GB | 2 382 251 | 5/2003 |
| JP | 60-089213 | 5/1985 |

(Continued)

OTHER PUBLICATIONS

Hajdiab H et al:"Vision Based Robot Localization"Haptic, Audio and Visual Environments and Their Applications, 2003. Have 2003. Proceedings. The 2ndIEEE International Workshop on Sep. 20-21, 2003, Piscatwaway, NJ, USA, IEEE Sep. 20, 200.*

(Continued)

*Primary Examiner* — Imran Mustafa
(74) *Attorney, Agent, or Firm* — Staas & Halsey LLP

(57) ABSTRACT

An apparatus and method for estimating a location of a mobile body and generating a map of a mobile body environment using an upper image of the mobile body environment, and a computer readable recording medium storing a computer program for controlling the apparatus. The apparatus includes: a landmark generating unit observing corner points from the upper image obtained by photographing in an upper vertical direction in the mobile body environment and respectively generating landmarks from the observed corner points; and a location and map operation unit estimating the location of the mobile body and generating the map of the mobile body environment from the landmarks.

19 Claims, 23 Drawing Sheets

(56) References Cited

U.S. PATENT DOCUMENTS

| | | | |
|---|---|---|---|
| 2002/0153184 A1 | 10/2002 | Song et al. | |
| 2003/0216834 A1 | 11/2003 | Allard | 700/245 |
| 2004/0167669 A1* | 8/2004 | Karlsson et al. | 700/259 |

FOREIGN PATENT DOCUMENTS

| | | |
|---|---|---|
| JP | 10-177414 | 6/1998 |
| JP | 11-259659 | 9/1999 |
| JP | 2004-012429 | 1/2004 |
| JP | 2004-276168 | 10/2004 |
| JP | 2004-355601 | 12/2004 |
| KR | 10-2006-0013022 | 2/2006 |
| WO | 2004/059900 | 7/2004 |
| WO | WO 2004059900 A2 * | 7/2004 |

OTHER PUBLICATIONS

Harris, Chris "A Combined Corner and Edge Detector", Plessy Research Roke Manor, Unied Kingdom, The Plessey Company plc, 1988.*

Vision-Based Robot Localization by Hajdiab et al., 2nd IEEE International Workshop on Sep. 20, 2003, pp. 19-24.

Robot Navigation Using Panoramic Tracking by Fiala et al., vol. 37, No. 11, Nov. 2004, pp. 2195-2215.

Fiala, M. et al., "Robot Navigation Using Panoramic Tracking," Pattern Recognition, vol. 37, No. 11, pp. 2195-2215, Nov. 2004.

Hajjdiab, H. et al., "Vision-Based Robot Localization," $2^{nd}$ IEEE International Workshop on Audio and Visual Environments and Their Applications, pp. 19-24, Sep. 2003.

Thrun, S. et al., "Robust Monte Carlo Localization for Mobile Robots," Artificial Intelligence, pp. 1-49, Feb. 2001.

Guivant, J. et al., "Simultaneous Localization and Map Building Using Natural Features and Absolute Information," Robotics and Autonomous Systems, vol. 984, pp. 1-12, 2002.

Lang, S. et al., "Visual Correction of Orientation Error for a Mobile Robot," IEEE International Conference on Intelligent Robots and Systems, pp. 1328-1333, 1999.

Davison, A. et al., "Real-Time 3D Slam with Wide-Angle Vision," $5^{th}$ IFAC/EURON Symposium on Intelligent Autonomous Vehicles, Jul. 2004.

Se, S. et al., "Mobile Robot Localization and Mapping with Uncertainty using Scale-Invariant Visual Landmarks," International Journal of Robotics Research, vol. 21, No. 8, pp. 735-758, Aug. 2002.

Harris, C. et al., "A Combined Corner and Edge Detector," Plessey Research Roke Manor, pp. 147-151, 1998.

Lowe, D., "Distinctive Image Features from Scale-Invariant Keypoints," International Journal of Computer Vision, pp. 1-28, 2004.

Lucas, B. et al., "An Iterative Image Registration Technique with an Application to Stereo Vision," Proceedings of Imaging Understanding Workshop, pp. 121-130, 1981.

Japanese Office Action dated Jul. 7, 2009 issued in Japanese Patent Application No. 2006-016141.

Japanese Office Action issued Jan. 11, 2011 in corresponding Japanese Patent Application 2006-016141.

M.W.M.G. Dissanayake et al., "A Solution to the Simultaneous Localisation and Map Building (SLAM) Problem", 2006, 14 pages.

Chris Harris et al., "A Combined Corner and Edge Detector", The Plessey Company, 1988, pp. 147-152.

Krystian Mikolajczyk et al., "A performance evaluation of local descriptors", Oct. 2004, 33 pages.

Extended European Search Report dated May 24, 2006 issued by the EPO in European Patent Application 06250337.0.

* cited by examiner

| sub | xd | yd | thd | x | y | th | dist | angle |
|---|---|---|---|---|---|---|---|---|
| 1 | 0 | 0 | 0 | 0.3 | -10.8 | 2 | 10.80417 | 2 |
| 1 | 375 | 0 | 0 | 375.9 | -1.1 | -1.5 | 1.421267 | 1.5 |
| 1 | 375 | -140 | -90 | 371.1 | -143.8 | -92.5 | 5.445181 | 2.5 |
| 1 | 465 | -140 | 0 | 461.4 | -145.1 | -3.1 | 6.242596 | 3.1 |
| 1 | 465 | -80 | 90 | 464.2 | -85.7 | 85.9 | 5.755867 | 4.1 |
| 1 | 375 | 0 | 90 | 375.2 | 1.2 | 88.7 | 1.216553 | 1.3 |
| 1 | 375 | 100 | 90 | 377.8 | 99.7 | 88.2 | 2.816026 | 1.8 |
| 1 | 375 | 100 | -180 | 68.7 | 94.3 | -177.9 | 5.846366 | 2.1 |
| 1 | 70 | 240 | 90 | 66.3 | 233.7 | 91.6 | 7.306162 | 1.6 |
| 1 | 70 | 240 | -180 | -6.6 | 230.6 | -179.1 | 11.48564 | 0.9 |
| 2 | 0 | 0 | 0 | 1.5 | -10.7 | 1.4 | 10.80463 | 1.4 |
| 2 | 375 | 0 | 0 | 376.3 | -1.2 | -1.6 | 1.769181 | 1.6 |
| 2 | 375 | -140 | -90 | 371.2 | -143.4 | -92.4 | 5.09902 | 2.4 |
| 2 | 465 | -140 | 0 | 461.7 | -144.7 | -4.6 | 5.742822 | 4.6 |
| 2 | 465 | -80 | 90 | 464.1 | -85.1 | 84.7 | 5.178803 | 5.3 |
| 2 | 375 | 0 | 90 | 375.7 | 1.5 | 89.5 | 1.655295 | 0.5 |
| 2 | 375 | 100 | 90 | 378.5 | 100.8 | 88.4 | 3.590265 | 1.6 |
| 2 | 70 | 100 | -180 | 68.6 | 93.8 | -177.9 | 6.356099 | 2.1 |
| 2 | 70 | 240 | 90 | 66.2 | 233.5 | 92.4 | 7.529276 | 2.4 |
| 2 | 0 | 240 | -180 | -6.4 | 230.1 | -178.8 | 11.78855 | 1.2 |
| 3 | 0 | 0 | 0 | 4.2 | -9.4 | 1.9 | 10.29563 | 1.9 |
| 3 | 375 | 0 | 0 | 375.6 | -3.8 | -0.6 | 3.847077 | 0.6 |
| 3 | 375 | -140 | -90 | 372.2 | -141.8 | -92.6 | 3.328663 | 2.6 |
| 3 | 465 | -140 | 0 | 462.4 | -144.5 | -0.7 | 5.197115 | 0.7 |
| 3 | 465 | -80 | 90 | 463.4 | -84.2 | 89 | 4.494441 | 1 |
| 3 | 375 | 0 | 90 | 375.8 | -1.4 | 89.3 | 1.612452 | 0.7 |
| 3 | 375 | 100 | 90 | 375.9 | 102.7 | 87.1 | 2.84605 | 2.9 |

FIG. 30

APPARATUS AND METHOD FOR ESTIMATING LOCATION OF MOBILE BODY AND GENERATING MAP OF MOBILE BODY ENVIRONMENT USING UPPER IMAGE OF MOBILE BODY ENVIRONMENT, AND COMPUTER READABLE RECORDING MEDIUM STORING COMPUTER PROGRAM CONTROLLING THE APPARATUS

CROSS-REFERENCE TO RELATED APPLICATION

This application claims the benefit of Korean Patent Application No. 10-2005-0006573, filed on Jan. 25, 2005, in the Korean Intellectual Property Office, the disclosure of which is incorporated herein by reference.

BACKGROUND OF THE INVENTION

1. Field of the Invention

The present invention relates to a mobile body such as a robot, and more particularly, to an apparatus and method for estimating the location of the mobile body and generating a map of the mobile body environment using an upper image of the mobile body environment, and a computer readable recording medium storing a computer program for controlling the apparatus.

2. Description of Related Art

In conventional methods of generating a map of a robot environment, a very precise map can be obtained using scan matching, but a very high-priced sensor such as a laser range finder is required. One such conventional method is disclosed in the paper entitled "Robust Monte Carlo Localization for Mobile Robots," S. Thrun, D. Fox, W. Burgard, and F. Dellaert, Artificial Intelligence, Vol. 128, No. 1-2, 2000, pp. 99-141. In the above conventional method, a map is generated using ceiling images as well as a laser range finder. However, since the ceiling images should be stored altogether, a large computational amount is required and recognizing a location of robot and generating a map of a robot environment cannot be simultaneously performed. Another conventional method is disclosed in the paper entitled "Simultaneous Localization and Map Building Using Natural Features and Absolute Information," Jose Guivant, Favio Masson, and Eduardo Nebot, Robotics and Autonomous Systems, 984, 2002, pp. 1-12. This conventional method is suggested to be mainly used outdoors. In the method, generating a map of a robot environment and recognizing a location of the robot can be simultaneously performed. However, even in the method, a high-priced laser range finder should be used. Another conventional method is disclosed in the paper entitled "Visual Correction of Orientation Error for a Mobile Robot," S. Lang, F. Yili, and S. K. Tso, Proc. of International Conf. on Intelligent Robots and Systems, 1999, pp. 1328-1333, and in U.S. Pat. No. 5,793,934 entitled "Method for the Orientation, Route Planning and Control of an Autonomous Mobile Unit". However, even in this case, recognizing a location of a robot and generating a map of a robot environment cannot be simultaneously performed.

Another conventional method of recognizing a location of a robot and generating a map of a robot environment are also disclosed in the paper entitled "Real-Time 3D SLAM with Wide-Angle Vision", Andrew J. Davison, Yolanda Gonzalez Cid, and Nobuyuki Kita, Proc. IFAC Symposium on Intelligent Autonomous Vehicles, 2004. All the conventional methods are affected by illumination. Another conventional method is disclosed in the paper entitled "Mobile Robot Localization and Mapping with Uncertainty Using Scale-Invariant Visual Landmarks", Stephen Se, David Lowe, and Jim Little, International Journal of Robotics Research, Volume 21, Number 8, August 2002, pp. 735-758. In this conventional method, two cameras should be used and the method is affected by illumination variation so that a location of a robot and a map of a robot environment cannot be precisely respectively recognized and generated.

BRIEF SUMMARY

An aspect of the present invention provides an apparatus for estimating a location of a mobile body and generating a map of a mobile body environment, the apparatus using an upper image of the mobile body environment obtained only by a simple low-priced camera.

An aspect of the present invention also provides a method of estimating a location of a mobile body and generating a map of a mobile body environment, the method using an upper image of the mobile body environment obtained only by a simple low-priced camera.

An aspect of the present invention also provides a computer readable recording medium storing a computer program for controlling the apparatus for estimating a location of a mobile body and generating a map of a mobile body environment.

According to an aspect of the present invention, there is provided an apparatus for estimating a location of a mobile body and generating a map of a mobile body environment using an upper image of the mobile body environment, the apparatus including: a landmark generating unit observing corner points from the upper image obtained by photographing in an upper vertical direction in the mobile body environment and respectively generating landmarks from the observed corner points; and a location and map operation unit estimating the location of the mobile body and generating the map of the mobile body environment from the landmarks.

According to another aspect of the present invention, there is provided a method of estimating a location of a mobile body and generating a map of a mobile body environment using an upper image of the mobile body environment, the method including: observing corner points from the upper image obtained by photographing in an upper vertical direction in the mobile body environment and respectively generating landmarks from the observed corner points; and estimating the location of the mobile body and generating the map of the mobile body environment from the landmarks.

According to another aspect of the present invention, there is provided a computer-readable storage medium encoded with processing instructions for causing a processor to execute a method of controlling an apparatus for estimating a location of a mobile body and generating a map of a mobile body environment using an upper image according to a process including: observing corner points from the upper image obtained by photographing in an upper vertical direction in the mobile body environment and respectively generating landmarks from the observed corner points; and estimating the location of the mobile body and generating the map of the mobile body environment from the landmarks.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 30 illustrates an example of measurement data when 45 sample data are obtained by measuring each of 15 points three times using the above-described measuring method;

DETAILED DESCRIPTION OF EMBODIMENTS

Figure 1:
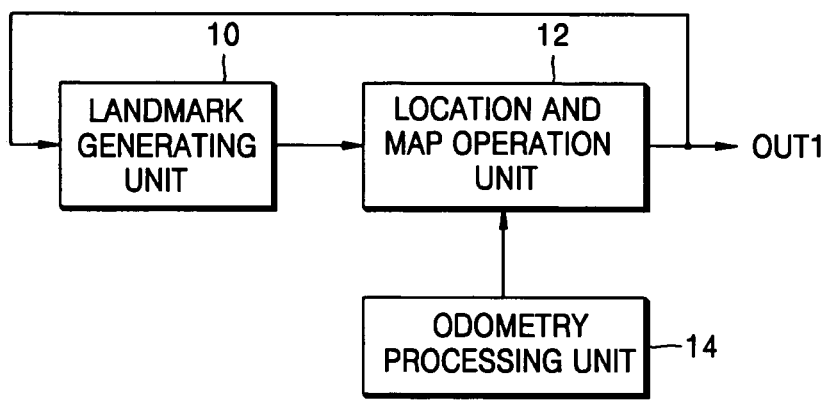
FIG. 1 is a block diagram of an apparatus for estimating a location of a mobile body and generating a map of a mobile body environment, the apparatus using an upper image of the mobile body environment, according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an apparatus for estimating location of a mobile body and generating a map of a mobile body environment using an upper image of the mobile body environment, according to an embodiment of the present invention. The apparatus of FIG. 1 comprises a landmark generating unit 10, a location and map operation unit 12, and an odometry processing unit 14.

Figure 2:
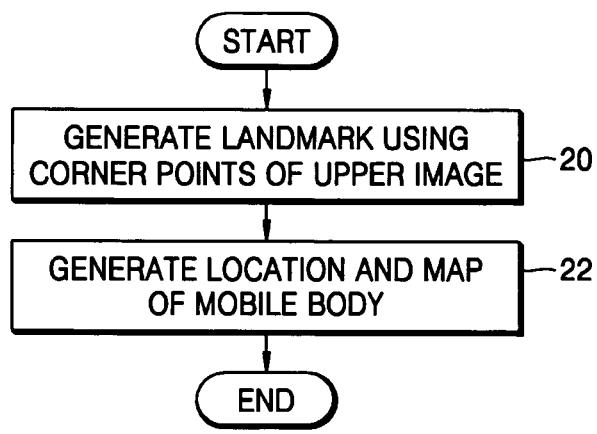
FIG. 2 is a flowchart illustrating a method of estimating a location of a mobile body and generating a map of a mobile body environment, the method using an upper image of the mobile body environment, according to another embodiment of the present invention.

FIG. 2 is a flowchart illustrating a method of estimating a location of a mobile body and generating a map of a mobile body environment using an upper image of the mobile body environment, according to another embodiment of the present invention. The method of FIG. 2 includes generating a landmark (operation 20) and estimating the location of the mobile body and generating the map of the mobile body (operation 22).

In operation 20, the landmark generating unit 10 observes corner points of an upper image of the mobile body environment and generates landmarks corresponding to the observed corner points, respectively. In this case, the landmarks can be automatically generated. In operation 22, the landmark generating unit 10 searches for corner points that have been already used to generate landmarks or landmark candidates in a previous upper image, registers a corner point that has not been used to generate a landmark or a landmark candidate corresponding to a corner point in the previous upper image as a new landmark candidate, registers as a landmark a landmark candidate corresponding to a corner point that has been observed more than a predetermined number of times, and outputs the registered landmark to the location and map operation unit 12 using at least one of coordinates of corner points that have been observed in a current upper image and local feature descriptors (LFDs).

A corner point is a point that indicates a corner in the upper image, and the LFDs indicate the features of a corner point using the result of analyzing an ambient image of the corner point and classifies the corner points. The upper image is obtained by a camera (not shown) that is attached to the mobile body and faces upwards. A current upper image is an upper image that has been currently obtained, and a previous upper image is an image that was previously obtained and stored in an image buffer 32 shown in FIG. 3, which will be described later. Here, the upper image may be an image of a ceiling of an interior environment in which the mobile body moves or a wall surface adjacent to the ceiling. The mobile body can move while photographing such images.

Figure 3:
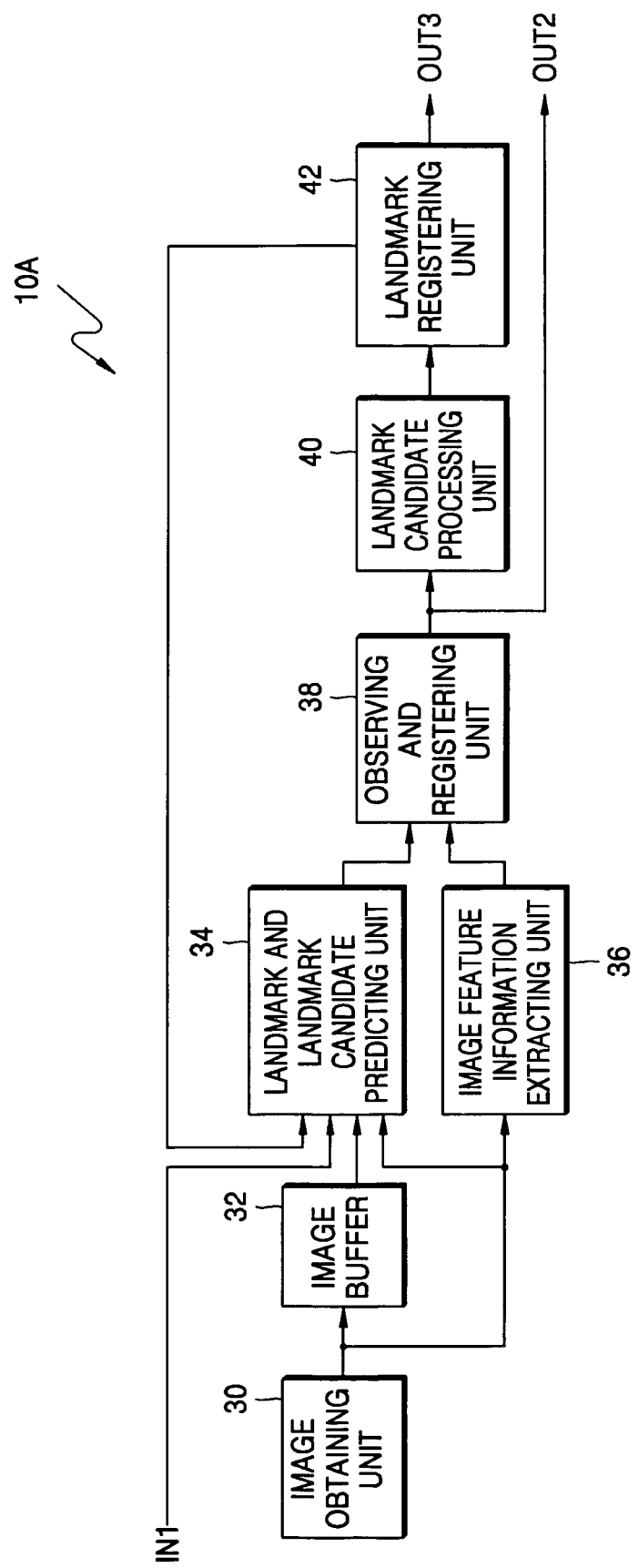
FIG. 3 is a block diagram of an example of a landmark generating unit shown in FIG. 1.

FIG. 3 is a block diagram of an example 10A of the landmark generating unit 10 shown in FIG. 1. The landmark generating unit 10A of FIG. 3 includes an image obtaining unit 30, an image buffer 32, a landmark and landmark candidate predicting unit 34, an image feature information extracting unit 36, an observing and registering unit 38, a landmark candidate processing unit 40, and a landmark registering unit 42.

Figure 4:
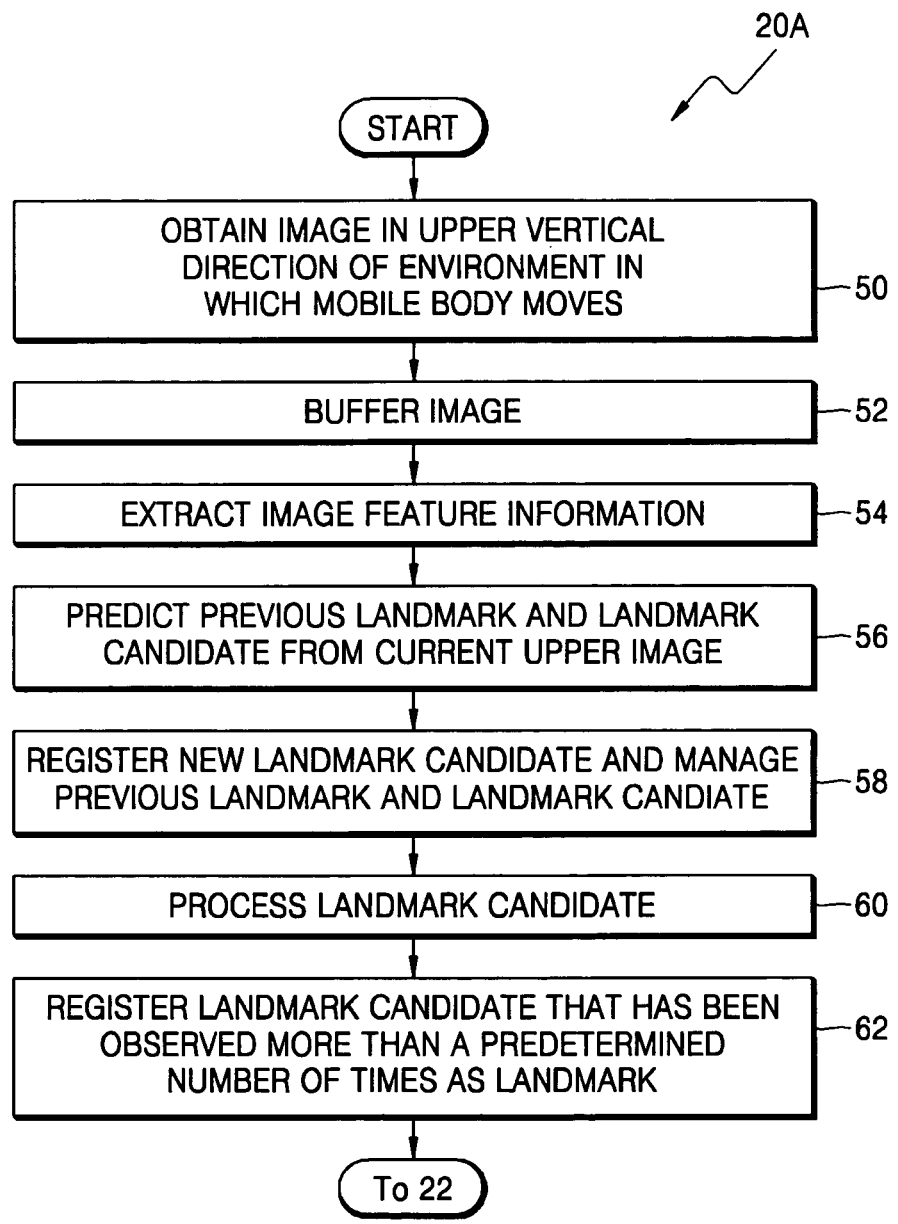
FIG. 4 is a flowchart illustrating an example of operation 20 shown in FIG. 2.

FIG. 4 is a flowchart illustrating an example 20A of operation 20. Operation 20A of FIG. 4 includes obtaining and buffering an upper image (operations 50 and 52), extracting image feature information and predicting a previous landmark and a previous landmark candidate from a current upper image (operations 54 and 56), registering a new landmark candidate and managing the previous landmark and the previous landmark candidate (operation 58), and processing the landmark candidate and registering a corresponding landmark candidate as a landmark (operations 60 and 62).

In operation 50, the image obtaining unit 30 of FIG. 3 obtains an image along an upper direction of the environment in which the mobile body moves, and outputs the obtained image to the image buffer 32, the landmark and landmark candidate predicting unit 34, and the image feature information extracting unit 36, respectively.

Figure 5:
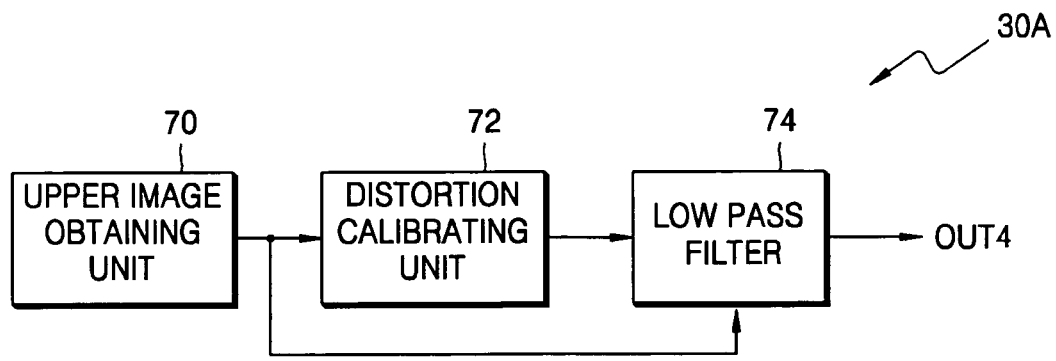
FIG. 5 is a block diagram of an example of an image obtaining unit shown in FIG. 3.

FIG. 5 is a block diagram of an example 30A of the image obtaining unit 30 shown in FIG. 3. Operation 30A of FIG. 5 includes an upper image obtaining unit 70, a distortion calibrating unit 72, and a low pass filter (LPF) 74.

Figure 6:
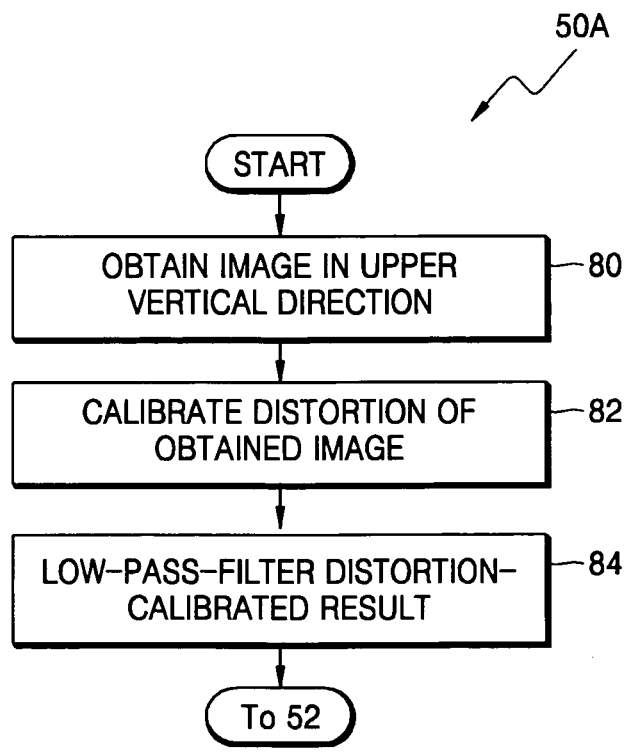
FIG. 6 is a flowchart illustrating an example of operation 50 shown in FIG. 4.

FIG. 6 is a flowchart illustrating an example 50A of operation 50 shown in FIG. 4. Operation 50A of FIG. 6 includes obtaining an upper image (operation 80) and calibrating distortion of the upper image (operation 82), and performing low-pass-filtering (operation 84).

Referring to FIGS. 5 and 6, according to an embodiment of the present invention, in operation 80, the image obtaining unit 70 obtains the upper image in an upper vertical direction of the environment in which the mobile body is placed, and outputs the obtained upper image to the distortion calibrating unit 72.

After operation 80, in operation 82, the distortion calibrating unit 72 calibrates the distortion of the upper image obtained by the upper image obtaining unit 70 and outputs the distortion-calibrated result to the low pass filter (LPF) 74. According to the present invention, in order to reduce the computational amount, the distortion calibrating unit 72 may set a region of interest (ROI) 90 in the upper image obtained by the upper image obtaining unit 70 and calibrate a distortion only in the set ROI 90.

Figure 7A:
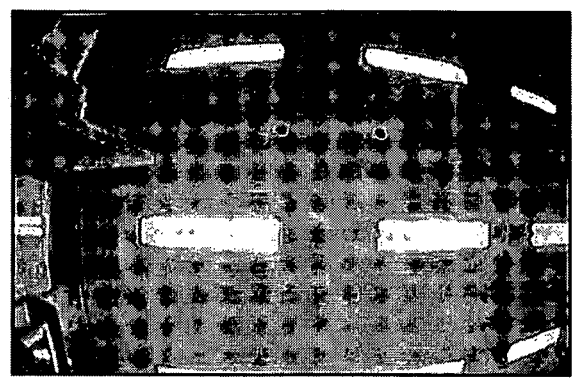
FIG. 7A illustrates an example of an image inputted into a distortion calibrating unit and FIG. 7B illustrates an example of an image outputted from the distortion calibrating unit.
Figure 7B:
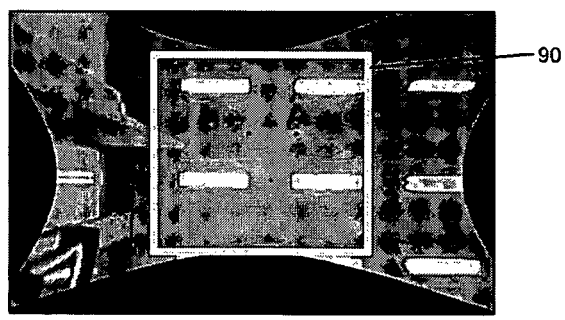

FIG. 7A illustrates an example of an image inputted into the distortion calibrating unit 72, and FIG. 7B illustrates an example of an image outputted from the distortion calibrating unit 72.

For example, when the upper image obtaining unit 70 that can be mounted on the mobile body is a wide-angle camera (not shown) having a fish-eye lens (not shown) so as to obtain the image of a wider region in a vertical direction of the environment in which the mobile body is placed, an image obtained by the upper image obtaining unit 70 is distorted as shown FIG. 7A. Thus, the distortion calibrating unit 72 inputs the distorted image shown in FIG. 7A, calibrates the distortion of the image, and outputs the image shown in FIG. 7B as the distortion-calibrated result. In this case, as described previously, in order to reduce the computational amount, the distortion calibrating unit 72 may calibrate the distortion only in the region of interest (ROI) 90.

A technique for image distortion calibration is disclosed in the paper entitled "A Simple Calibration Procedure for Fisheye (high Distortion) Lens Camera", S. Shah and J. K. Aggarwal, IEEE International Conf. on Robotics and Automation, Vol. 4, May 1994, pp. 3422-3427.

After operation 82, in operation 84, the LPF 74 performs low-pass-filtering on the distortion-calibrated result so as to remove noise of harmonics from the distortion-calibrated result obtained by the distortion calibrating unit 72 and outputs the result of low-pass-filtering through an output terminal OUT4. In this way, the smoothing effect of an image can be achieved. To this end, the LPF 74 may be a Gaussian filter (not shown).

For example, in the case of a 3×3 Gaussian kernel, the LPF 74 outputs the result of filtering shown in Equation 1 through an output terminal OUT4.

$$I'(x, y) = \frac{\sum_{i=-1}^{1} \sum_{j=-1}^{1} I(x+i, y+j) G(i+1, j+1)}{\sum_{i=-1}^{1} \sum_{j=-1}^{1} G(i+1, j+1)}, \quad (1)$$

where I'(x,y) is a brightness intensity at a coordinate (x,y) of an image outputted from the LPF 74, I(x+i,y+j) is a brightness intensity at a coordinate (x+i,y+j) of an image inputted into the LPF 74, and G(m,n)=$G_{mn}$ is an element of a matrix G expressed by Equation 2.

$$G = \begin{bmatrix} G(0,0) & G(0,1) & G(0,2) \\ G(1,0) & G(1,1) & G(1,2) \\ G(2,0) & G(2,1) & G(2,2) \end{bmatrix}, \quad (2)$$

where G may be expressed as shown in Equation 3, for example.

$$G = \begin{bmatrix} 1 & 2 & 1 \\ 2 & 4 & 2 \\ 1 & 2 & 1 \end{bmatrix}. \quad (3)$$

According to another embodiment of the present invention, unlike in FIG. 5, the image obtaining unit 30 may be implemented using only the upper image obtaining unit 70. In this case, unlike in FIG. 6, operation 50 may include only operation 80. In this case, an image obtained by the upper image obtaining unit 70 is outputted to the image buffer 32, the landmark and landmark candidate predicting unit 34, and the image feature information extracting unit 36, respectively.

According to another embodiment of the present invention, unlike in FIG. 5, the image obtaining unit 30 may be implemented using only the upper image obtaining unit 70 and the distortion calibrating unit 72. In this case, unlike in FIG. 6, operation 50 includes only operations 80 and 82. In this case, the distortion-calibrated result obtained by the distortion calibrating unit 72 is outputted to the image buffer 32, the landmark and landmark candidate predicting unit 34, and the image feature information extracting unit 36, respectively.

According to another embodiment of the present invention, unlike in FIG. 5, the image obtaining unit 30 may be implemented using only the upper image obtaining unit 70 and the LPF 74. In this case, unlike in FIG. 6, operation 50 includes only operations 80 and 84. In this case, in operation 84, the LPF 74 performs low-pass-filtering on the upper image obtained by the upper image obtaining unit 70 and outputs the result of low-pass-filtering through an output terminal OUT4.

After operation 50, in operation 52, the image buffer 32 buffers the image obtained by the image obtaining unit 30 and outputs the result of buffering to the landmark and landmark candidate predicting unit 34 as a previous upper image. That is, the image buffer 32 inputs a current upper image and simultaneously outputs a previous upper image.

After operation 52, in operation 54, the image feature information extracting unit 36 extracts at least one of coordinates of corner points that have been observed at the current upper image obtained by the image obtaining unit 30 and local feature descriptors (LFDs) as image feature information and outputs the extracted image feature information to the observing and registering unit 38.

Figure 8:
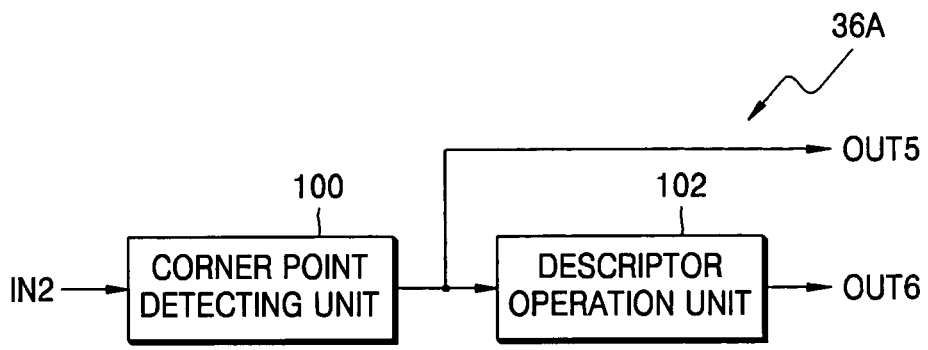
FIG. 8 is a block diagram of an example of an image feature information extracting unit shown in FIG. 3.

FIG. 8 is a block diagram of an example 36A of the image feature information extracting unit 36 shown in FIG. 3. The image feature information extracting unit 36A of FIG. 8 includes a corner point detecting unit 100 and a descriptor operation unit 102.

Figure 9:
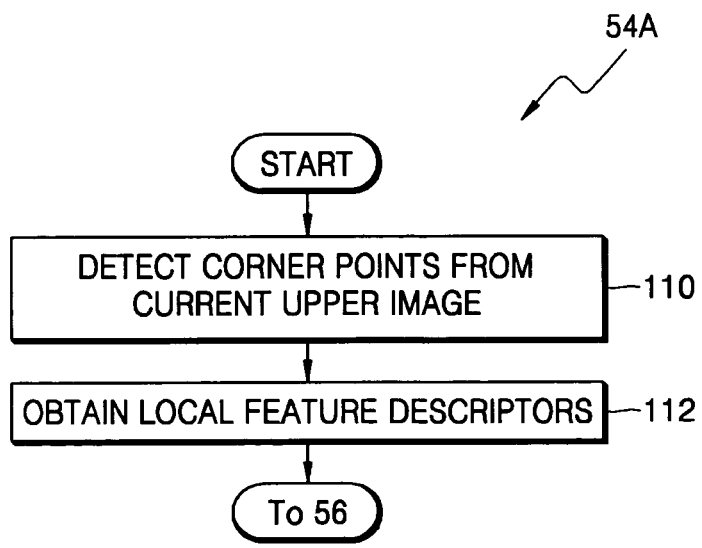
FIG. 9 is a flowchart illustrating an example of operation 54 shown in FIG. 4.

FIG. 9 is a flowchart illustrating an example 54A of operation 54 shown in FIG. 4. Operation 54A of FIG. 9 includes detecting corner points (operation 110) and obtaining local feature descriptors (LFDs) (operation 112).

In operation 110, the corner point detecting unit 100 detects corner points from the current upper image inputted from the image obtaining unit 30 through an input terminal IN2 and outputs coordinates of the detected corner points to the descriptor operation unit 102 as image feature information through an output terminal OUT5.

Figure 10A:
FIGS. 10A and 10B are diagrams for understanding a corner point detecting unit.
Figure 10B:
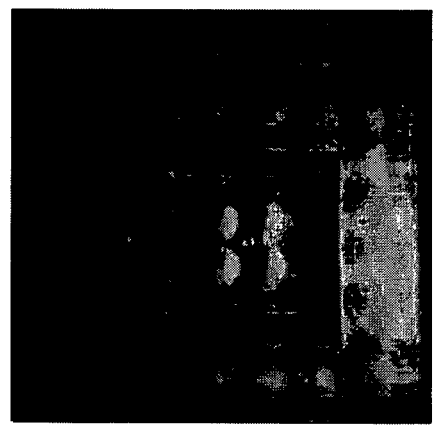

FIGS. 10A and 10B are diagrams for understanding the corner point detecting unit 100. FIG. 10A illustrates an example of an image inputted into the corner point detecting unit 100, and FIG. 10B illustrates cross-shaped corner points detected by the corner point detecting unit 100.

According to an embodiment of the present invention, the corner point detecting unit 100 may detect corner points using the Harris corner point detection method, for example. The Harris corner point detection method is disclosed in the paper "A Combined Corner and Edge Detector", C. J. Harris and M. Stephens, in Proc. 4$^{th}$ Alvey Version Conf., Manchester, 1988, pp. 147-151. In this case, for example, the corner point detecting unit 100 may input the image shown in FIG. 10A and detect corner points as shown in FIG. 10B.

For example, according to the Harris corner point detection method, the corner point detecting unit 100 may determine a point where a value R expressed by Equation 4 is greater than 0 and which becomes a local maximum as a corner point.

$$R = \det(M) - k(\mathrm{tr}(M))^2 \quad (4),$$

where tr is a matrix trace, det is a matrix determinant, and M is a matrix with a gradient of image intensity obtained as Equation 5. According to the present invention, k may be 0.04.

$$M = \begin{bmatrix} \left(\frac{\partial I'}{\partial x}\right)^2 & \left(\frac{\partial I'}{\partial x}\right)\left(\frac{\partial I'}{\partial y}\right) \\ \left(\frac{\partial I'}{\partial x}\right)\left(\frac{\partial I'}{\partial y}\right) & \left(\frac{\partial I'}{\partial y}\right)^2 \end{bmatrix}, \quad (5)$$

where I' is the brightness intensity expressed by Equation 1 described above.

Referring to FIGS. 8 and 9, after operation 110, in operation 112, the descriptor operation unit 102 analyzes images around the corner points detected by the corner point detecting unit 100, performs an operation on a local feature descriptor (LFD) at each of the corner points using the analyzed result, and outputs the LFD as image feature information through an output terminal OUT6. According to the present invention, the LFD on which an operation has been performed by the descriptor operation unit 102 may be a scale invariant feature transform (SIFT) descriptor. The SIFT descriptor expresses the feature of a corner point using the distribution of a brightness gradient of an image around the corner point. To this end, the descriptor operation unit 102 inputs a current upper image from the image obtaining unit 30 through an input terminal IN2, inputs coordinates of the corner points detected by the corner point detecting unit 100, and outputs an LFD comprised of 128 bytes, for example.

According to the paper entitled "A Performance Evaluation of Local Descriptors" by K. Mikolajczk and C. Schmid, IEEE Conference on Computer Vision and Pattern Recognition, June 2003, the above-described SIFT descriptor is known the best one. In addition, a method of generating an SIFT descriptor is disclosed by David G. Lowe, in a paper entitled "Distinctive Image Features from Scale-invariant Keypoints", International Journal of Computer Vision, 60, 2, 2004, pp. 91-110.

Referring to FIGS. 3 and 4, after operation 54, in operation 56, the landmark and landmark candidate predicting unit 34 predicts whether a landmark and a landmark candidate in a previous upper image are located in a current upper image, and outputs the location of the landmark and the landmark candidate predicted from the current upper image to the observing and registering unit 38. Through this prediction, the observing and registering unit 28 of FIG. 3 can search for corner points that have been used to respectively generate landmarks and landmark candidates that have been already registered, from among the corner points detected from the current upper image.

In the case of a landmark candidate point that is predicted whenever an image is inputted into the landmark and landmark candidate predicting unit 34 and continuously followed in each image, the track of the origin of a two-dimensional image coordinate system in each image and the location and azimuth angle of the mobile body when an image is inputted are stored, and the stored information is used to estimate a three-dimensional coordinate value of a landmark when the landmark candidate point is registered as a landmark.

The landmark candidate predicting unit 34 of FIG. 3 inputs landmark information and the location and azimuth angle of the mobile body from the location and map operation unit 12 shown in FIG. 1 through an input terminal IN1, inputs landmark candidate information from the landmark registering unit 42, inputs a previous upper image from the image buffer 32, and inputs a current upper image from the image obtaining unit 30. Here, landmark information includes the location of a landmark, that is, a three-dimensional coordinate for the landmark in a world coordinate system and a local feature descriptor (LFD) for the landmark. The landmark candidate information includes the location of a landmark candidate, that is, a three-dimensional coordinate for the landmark candidate in the world coordinate system and an LFD for the landmark candidate.

Figure 11:
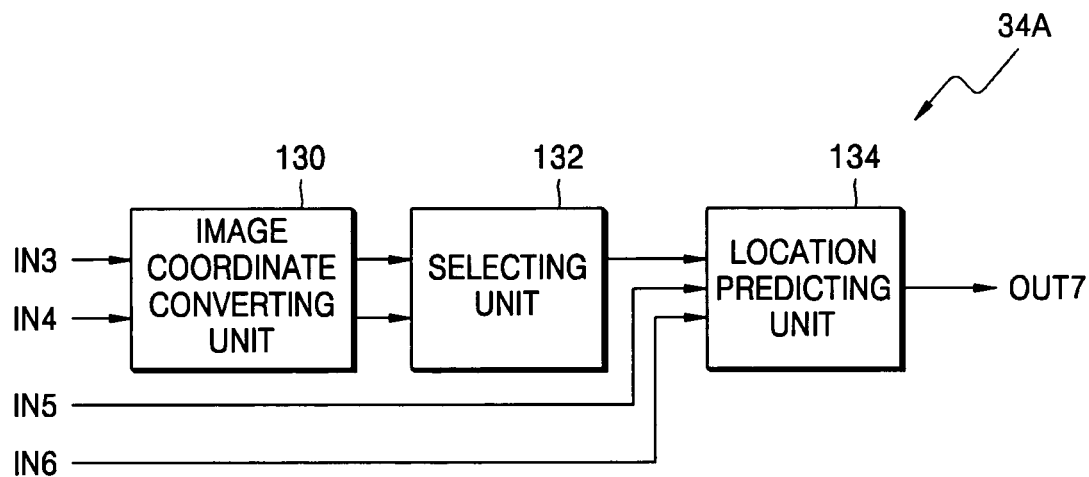
FIG. 11 is a block diagram of an example of a landmark and landmark candidate predicting unit shown in FIG. 3.

FIG. 11 is a block diagram of an example 34A of the landmark and landmark candidate predicting unit 34 shown in FIG. 3. The landmark and landmark candidate predicting unit 34A of FIG. 11 includes an image coordinate converting unit 130, a selecting unit 132, and a location predicting unit 134.

Figure 12:
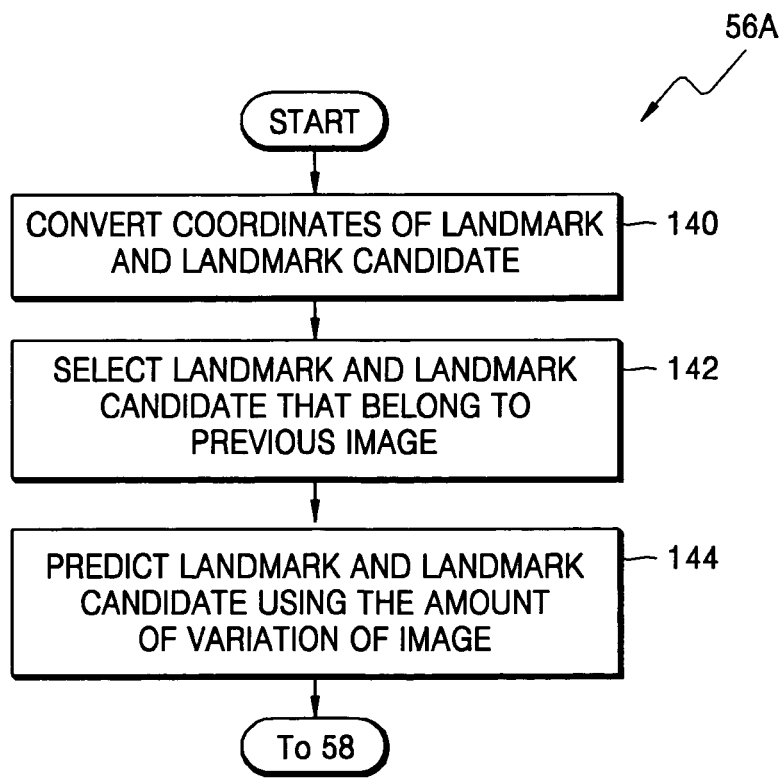
FIG. 12 is a flowchart illustrating an example of operation 56 shown in FIG. 4.

FIG. 12 is a flowchart illustrating an example 56A of operation 56 shown in FIG. 4. Operation 56A of FIG. 12 includes converting coordinates (operation 140), selecting a landmark and a landmark candidate that belong to a previous image, from landmarks and landmark candidates, and predicting a coordinate, that is, location of the landmark and the landmark candidate in a current upper image (operation 144).

Referring to FIGS. 11 and 12, after operation 54, in operation 140, the image coordinate converting unit 130 inputs landmark and landmark candidate information that have been previously registered, based on a previous upper image through input terminals IN3, converts three-dimensional coordinates of locations of a landmark and a landmark candidate included in each of the inputted landmark and landmark candidate information into a two-dimensional coordinate based on an image coordinate system of the previous upper image using the location and azimuth angle of the mobile body when the previous upper image is inputted, and outputs landmark and landmark candidate information having the converted two-dimensional coordinates to the selecting unit 132. To this end, the location and azimuth angle of the mobile body are inputted into the image coordinate converting unit 130 through an input terminal IN4.

Figure 13:
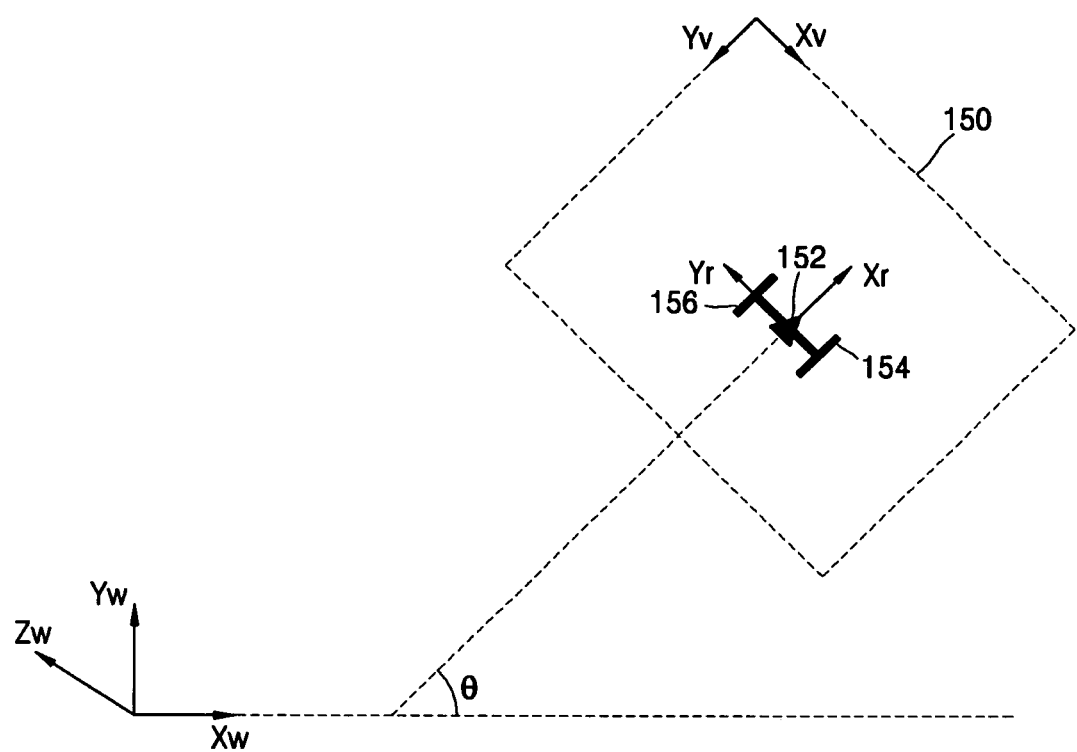
FIG. 13 illustrates coordinates for explaining an operation of an image coordinate converting unit.

FIG. 13 illustrates coordinates for explaining an operation of the image coordinate converting unit 130. Referring to FIG. 13, the image coordinate system is defined by two coordinate axes $X_v$ and $Y_v$ (v denotes an image coordinate system), the mobile-body coordinate system is defined by two coordinate axes $X_r$ and $Y_r$ (r denotes a mobile-body coordinate system), and the world coordinate system is defined by three coordinate axes $X_w$, $Y_w$, and $Z_w$ (w denotes a world coordinate system). Here, it is assumed that the mobile body having two wheels 154 and 156 moves along a direction of arrow 152, and the location coordinate of the mobile body is expressed by $(x,y,\theta)_w$ in the world coordinate system. Here, x,y are location coordinates, and $\theta$ is an azimuth angle. In this case, reference numeral 150 of FIG. 13 denotes the image obtained by the image obtaining unit 30 in a physical space in which the mobile body moves, in consideration of a field of view of a camera.

Locations of a landmark and a landmark candidate included in each of the landmark and landmark information inputted through input terminals IN3 of the image coordinate converting unit 130 may be expressed in the world coordinate system as $(x,y,z)_w$. In addition, each of the landmark and landmark candidates converted by the image coordinate converting unit 130 may be expressed in the image coordinate system $(x,y)_v$.

Referring to FIGS. 11 and 12, after operation 140, in operation 142, the selecting unit 132 selects only the landmark and the landmark candidate that belong to the previous upper image among the landmark and landmark candidates having the converted two-dimensional coordinates inputted from the image coordinate converting unit 130 and outputs the result of selection to the location predicting unit 134.

Figure 14:
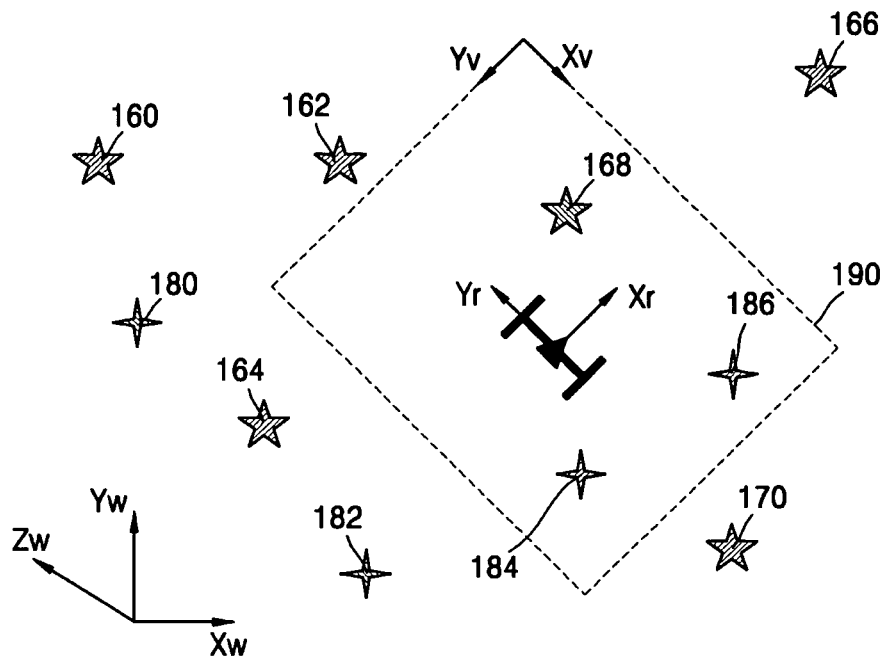
FIG. 14 is a diagram for understanding the selecting unit shown in FIG. 11.

FIG. 14 is a diagram which illustrates a plurality of landmarks 160, 162, 164, 166, 168, and 170 and a plurality of landmark candidates 180, 182, 184, and 186, for a better understanding of the selecting unit 132 shown in FIG. 11. For a better understanding of this embodiment of the present invention, landmarks and landmark candidates of FIG. 14 are identified by symbols but the present invention is not limited to this.

Referring to FIGS. 11-14, the selecting unit 132 selects only the landmark 168 and the landmark candidates 184 and 186 that belong to a previous upper image 190, from the landmarks 160, 162, 164, 166, 168, and 170 and the landmark candidates 180, 182, 184, and 186 having the converted two-dimensional coordinates, and outputs information about the selected landmark 168 and the landmark candidates 184 and 186 to the location predicting unit 134.

After operation 142, in operation 144, the location predicting unit 134 calculates from the result of selection inputted from the selection unit 132 the amount of variation between the current upper image inputted from the image obtaining unit 30 through an input terminal IN5 and the previous upper image inputted from the image buffer 32 of FIG. 3 through an input terminal IN6, that is, from each selected landmark and each selected landmark candidate, predicts a coordinate of a landmark and a landmark candidate which may exist in the current upper image, using the calculated amount of variation, and outputs the result of prediction to the observing and registering unit 38 through an output terminal OUT7. In this case, each of the coordinates of the result selected by the selecting unit 132 and the result predicted by the location predicting unit 134 is a two-dimensional coordinate in the image coordinate system.

Figure 15:
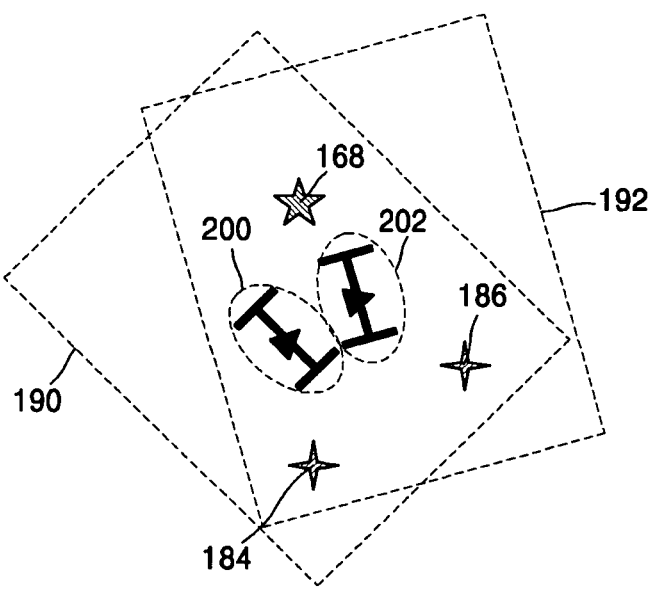
FIG. 15 is a diagram for understanding a location predicting unit.

FIG. 15 is a diagram for a better understanding of the location predicting unit 134. FIG. 15 illustrates a mobile body 200 in a previous upper image 190 and the mobile body 200 in a current upper image 192.

Referring to FIGS. 14 and 15, the location predicting unit 134 of FIG. 11 calculates the amount of variation between the current upper image 192 and the previous upper image 190 from each of a landmark 168 and landmark candidates 184 and 186, which are selected by the selecting unit 132, predicts each coordinate of the landmark 168 and the landmark candidates 184 and 186 which may exist in the current upper image, using the calculated amount of variation, and outputs the result of prediction to the observing and registering unit 38 through an output terminal OUT7.

According to the present embodiment, the location predicting unit 134 may predict locations of a landmark and a landmark candidate which may exist in the current upper image using an optical flow tracker. Optical flow is a motion vector which can detect the amount of movement and the amount of rotation of an image using brightness gradient information between the current upper image and the previous upper image. A Lukas-Kanade optical flow tracker which is widely used is disclosed in the paper entitled "An Iterative Image Registration Technique with an Application to Stereo Vision", Lucas, B. and Kanade, T, Proc. of 7th International Joint Conference on Artificial Intelligence (IJCAI), pp. 674-679.

According to the present embodiment, unlike in FIG. 4, operations 54 and 56 may be performed simultaneously, or operation 56 may be performed earlier than operation 54.

Referring to FIGS. 3 and 4, after operation 56, in operation 58, the observing and registering unit 38 compares information about the landmark and the landmark candidate, which are predicted by the landmark and landmark candidate predicting unit 34, with image feature information inputted from the image feature information extracting unit 36, observes and searches for corner points that have been used to generate landmarks or landmark candidates in the previous upper image, among corner points searched from the current upper image, using the compared result, registers a corner point that has not been used as a landmark or a landmark candidate in the previous upper image, as a new landmark candidate, and manages information about the landmark or the landmark candidate which correspond to the searched corner point. In this case, the observing and registering unit 38 outputs landmark candidate information about the new registered landmark candidate and the managed landmark candidate to the landmark candidate processing unit 40 and outputs landmark information about the managed landmark to the location and map operation unit 12 shown in FIG. 1 through an output terminal OUT2.

Figure 16:
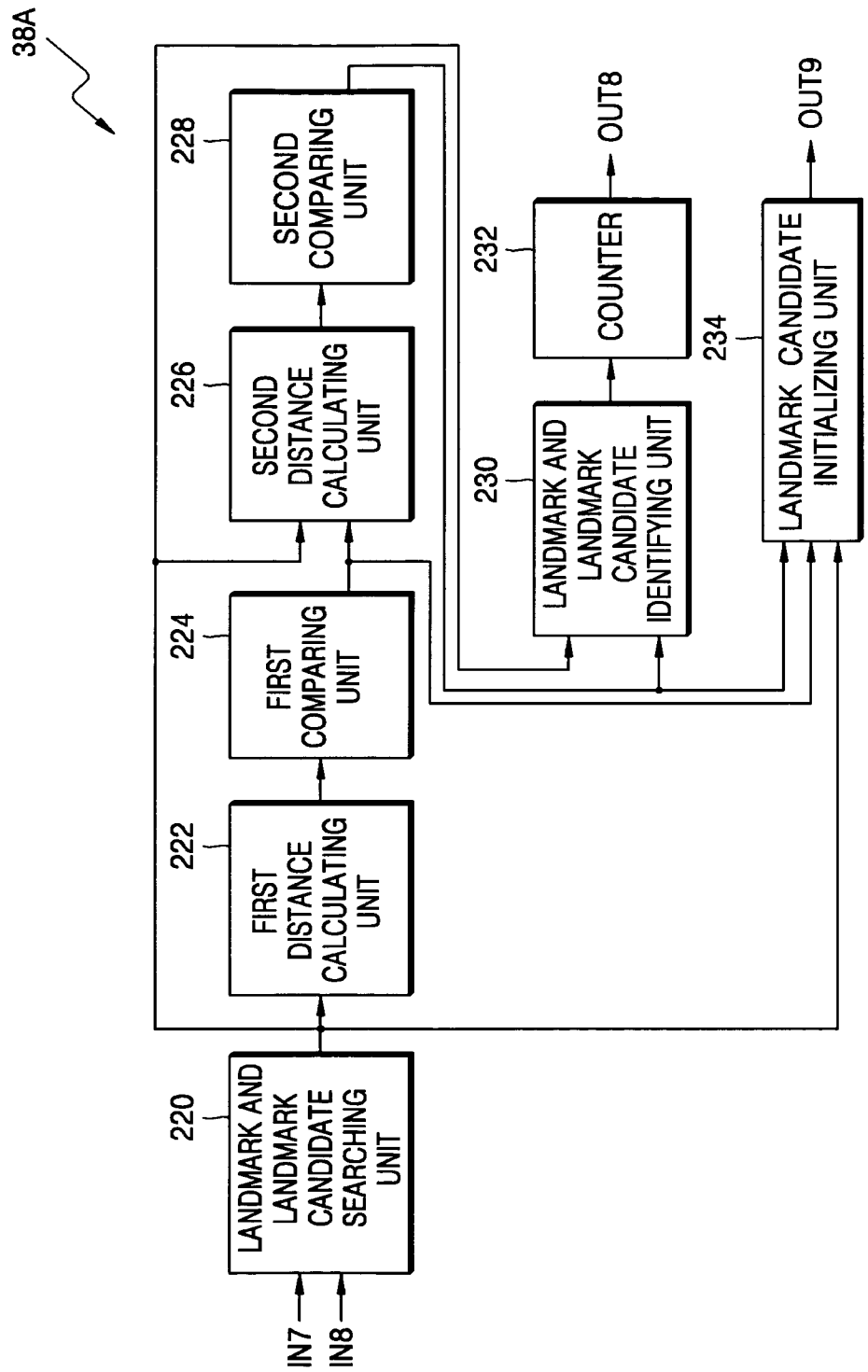
FIG. 16 is a block diagram of an example of an observing and registering unit shown in FIG. 3.

FIG. 16 is a block diagram of an example 38A of the observing and registering unit 38 shown in FIG. 3. The observing and registering unit 38A of FIG. 16 includes a landmark and landmark candidate searching unit 220, first and second distance calculating units 222 and 226, first and second comparing units 224 and 228, a landmark and landmark candidate identifying unit 230, a counter 232, and a landmark candidate initializing unit 234.

Figure 17:
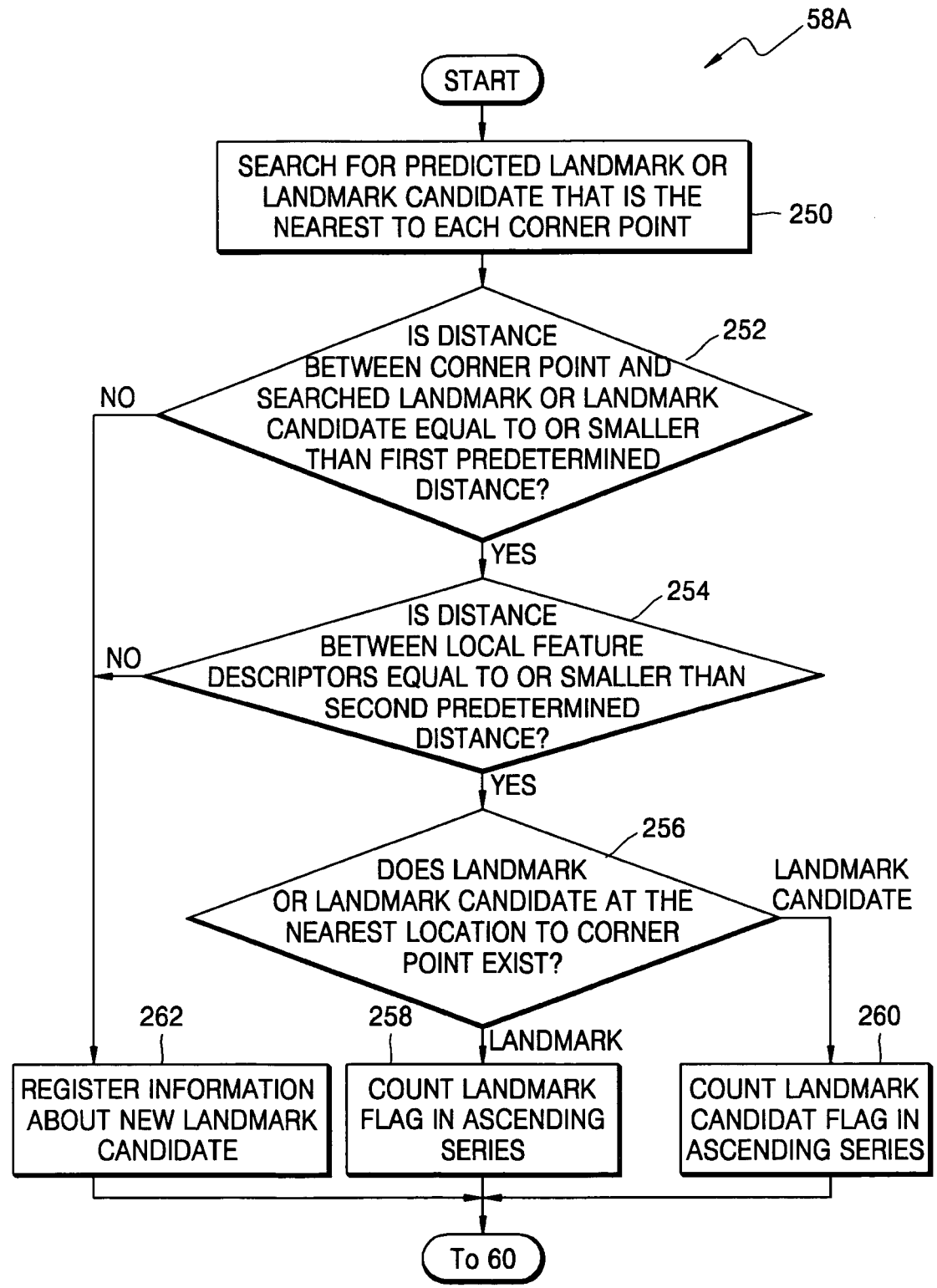
FIG. 17 is a flowchart illustrating an example of operation 58 shown in FIG. 4.

FIG. 17 is a flowchart illustrating an example 58A of operation 58 shown in FIG. 4. Operation 58A of FIG. 17 includes searching for the nearest predicted landmarks or landmark candidates corresponding to each of the corner points (operation 250) and registering a new landmark candidate according to a distance between the new landmark candidate and a corresponding corner point or managing a landmark and a landmark candidate (operations 252 to 262).

Figure 18:
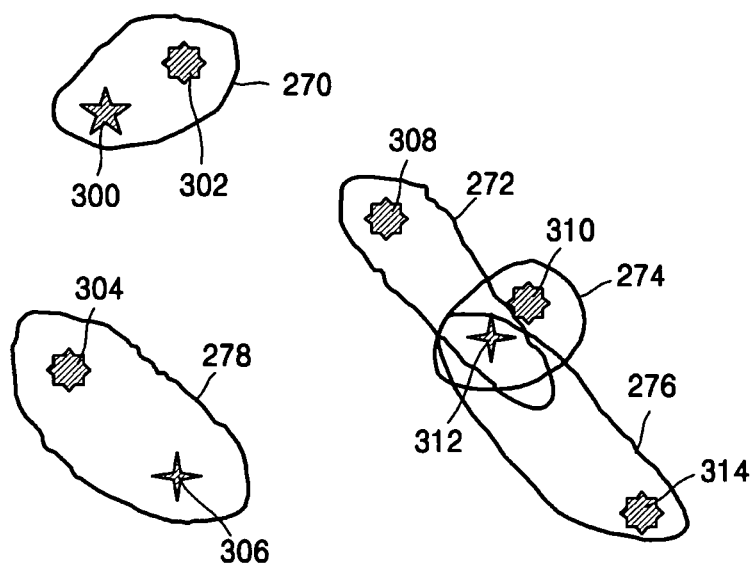
FIG. 18 is an exemplary drawing for understanding the observing and registering unit shown in FIG. 16.

FIG. 18 is an exemplary drawing for understanding the observing and registering unit 38 shown in FIG. 16. Referring to FIGS. 3, 17, and 18, observing and registering unit 38 of FIG. 18 includes a landmark 300 predicted by the landmark and landmark candidate predicting unit 34 from a current upper image, landmark candidates 306 and 312 predicted by the landmark and landmark candidate predicting unit 34 from the current upper image, and corner points 302, 304, 308, 310, and 314 searched from the current upper image inputted from the image feature information extracting unit 36.

In operation 250, the landmark and landmark candidate searching unit 220 inputs corner points included in image feature information inputted from the image feature information extracting unit 36 through an input terminal IN7 and information about a landmark and/or a landmark candidate predicted by the landmark and landmark candidate predicting unit 34 through an input terminal IN8 and searches for the nearest landmark or landmark candidate to the corner points among the predicted landmarks or landmark candidates.

Referring to FIG. 18, in operation 250, the landmark and landmark candidate searching unit 220 searches for the nearest landmark or landmark candidate to the corner point 302, 304, 308, 310 or 314. That is, the landmark and landmark candidate searching unit 220 searches for the predicted and nearest landmark 300 to the corner point 302, the predicted and nearest landmark candidate 306 to the corner point 304, the predicted and nearest landmark candidate 312 to the corner point 308, the predicted and nearest landmark candidate 312 to the corner point 310, and the predicted and nearest landmark candidate 312 to the corner point 314. In this case, the landmark and landmark candidate searching unit 220 forms pairs by binding the predicted and nearest landmarks or landmark candidates to the respective corner points and outputs information about each pair as shown in FIG. 18. That is, the corner point 302 and the predicted landmark 300 are bound as a pair 270, the corner point 304 and the predicted landmark candidate 306 are bound as a pair 278, the corner point 308 and the predicted landmark candidate 312 are bound as a pair 272, the corner point 310 and the predicted landmark candidate 312 are bound as a pair 274, and the corner point 314 and the predicted landmark candidate 312 are bound as a pair 276. That is, elements that belong to each pair 270, 272, 274, 276 or 278 are a corner point and a predicted landmark or landmark candidate.

After operation 250, in operation 252, with regard to each of corner points, it is determined whether a distance between a corner point and a predicted landmark or landmark candidate is equal to or smaller than a first predetermined distance. To this end, the first distance calculating unit 222 calculates a distance between the corner point and the searched landmark or landmark candidate and outputs the calculated distance to the first comparing unit 224. In this case, the first comparing unit 224 compares the distance calculated by the first distance calculating unit 222 with the first predetermined distance and outputs the compared result. For example, the first predetermined distance may be a 15-pixel distance. Here, a 1-pixel distance means a spatial length corresponding to one pixel length.

Referring to FIG. 18, the first distance calculating unit 222 calculates a distance between the corner point and the searched landmark or landmark candidate and outputs each calculated distance to the first comparing unit 224, with regard to each of the pairs 270, 272, 274, 276, and 278 inputted from the landmark and landmark candidate searching unit 220.

In operation 254, with regard to each of the corner points for which the distance between the corner point and the searched landmark or landmark candidate is equal to or smaller than the first predetermined distance, it is determined whether a distance between a local feature descriptor (LFD) of a corner point and an LFD of the searched landmark or landmark candidate is equal to or smaller than a second predetermined distance. To this end, if it is recognized through the result compared by the first comparing unit 224 that the distance between the corner point and the searched landmark or landmark candidate is equal to or smaller than the first predetermined distance, the second distance calculating unit 226 calculates an Euclidean distance between the LFD of the corner point and the LFD of the searched landmark or landmark candidate and outputs the calculated distance to the second comparing unit 228. To this end, the second distance calculating unit 226 inputs the LFDs from the landmark and landmark candidate searching unit 220. In this case, the second comparing unit 228 compares the distance calculated by the second distance calculating unit 226 with a second predetermined distance and outputs a compared result. For example, when the LFD is comprised of a vector having 128 elements and each element has a byte value ranging from 0 to 255, the second predetermined distance may be 638.

Referring to FIG. 18, the second distance calculating unit 226 selects each pair from the pairs 270, 272, 274, 276, and 278 inputted from the landmark and landmark candidate searching unit 220 for which it is recognized through the result compared by the first comparing unit 224 that the distance between the corner point and the searched landmark or landmark candidate is equal to or smaller than the first predetermined distance, calculates an Euclidian distance between the LFD of the corner point that belongs to the selected pair and the LFD of the searched landmark or landmark candidate that belongs to the selected pair and outputs the calculated distance to the second comparing unit 228.

If it is determined that the distance between the LFD of the corner point and the LFD of the searched landmark or landmark candidate is equal to or smaller than the second predetermined distance, in operation 256, it is determined whether a landmark or a landmark candidate exists at the nearest location to the corner point. To this end, if it is recognized through the result compared by the second comparing unit 228 that the distance between the LFD of the corner point and the LFD of the searched landmark or landmark candidate is equal to or smaller than the second predetermined distance, the landmark and landmark candidate identifying unit 230 identifies whether a landmark or a landmark candidate exists at the nearest location to the corner point and outputs the identified result to the counter 232.

Referring to FIG. 18, the landmark and landmark candidate identifying unit 230 identifies whether a landmark or a landmark candidate exists at the nearest location to the corner point and outputs an identified result to the counter 232, with respect to each pair for which it is recognized through the result compared by the second comparing unit 228 that the distance between the LFDs is equal to or smaller than the second predetermined distance, from pairs for which the distance between the corner point inputted from the landmark and landmark candidate searching unit 220 and the landmark or landmark candidate is equal to or smaller than the first predetermined distance. For example, when it is recognized for the pair 270 of FIG. 18 that the distance between the LFD of the corner point 302 and the LFD of the landmark 300 is equal to or smaller than the second predetermined distance, the landmark and landmark candidate identifying unit 230 identifies a landmark or a landmark candidate that forms a pair with the corner point 302 as the landmark 300. In addition, when it is recognized for the pair 274 of FIG. 18 that the distance between the LFD of the corner point 310 and the LFD of the landmark candidate 312 is equal to or smaller than the second predetermined distance, the landmark and landmark candidate identifying unit 230 identifies a landmark or a landmark candidate that forms a pair with the corner point 310 as the landmark candidate 312.

If it is recognized through the identified result inputted from the landmark and landmark candidate identifying unit 230 that not a landmark candidate but a landmark exists at the nearest location to the corner point, in operation 258, the counter 232 counts a landmark flag that indicates how many times a landmark has been observed, in an ascending series, and outputs the counted result through an output terminal OUT8. However, if it is recognized through the identified result inputted from the landmark and landmark candidate identifying unit 230 that not a landmark but a landmark candidate exists at the nearest location to the corner point, in operation 260, the counter 232 counts a landmark candidate flag that indicates how many times a landmark candidate has been observed, in an ascending series and outputs the counted result through an output terminal OUT8. That is, the counter 232 counts a landmark flag that indicates how many times a landmark has been observed, in an ascending series or counts a landmark candidate flag that indicates the number in which a landmark candidate has been observed, in an ascending series, in response to the result identified by the landmark and landmark candidate identifying unit 230. Here, the result for which the landmark flag is counted by the counter 232 in an ascending series is outputted as landmark information, and the result in which the landmark candidate flag is counted by the counter 232 in an ascending series is outputted as landmark candidate information.

For example, when it is recognized for the pairs 270, 274, and 278 of FIG. 18 that the distance between the LFDs is equal to or smaller than the second predetermined distance after performing operations 252 and 254 shown in FIG. 17, since the landmark 300 has been observed, the counter 232 counts a landmark flag value included in landmark information in an ascending series, and since two landmark candidates 306 and 312 have been observed, the counter 232 counts each landmark candidate flag value included in landmark candidate information in an ascending series.

In operation 262, the corner point more distant from the searched landmark or landmark candidate than the first predetermined distance or the corner point having an LFD more distant from an LFD of the searched landmark or landmark candidate than the second predetermined distance is determined as a new landmark candidate and information about the determined new landmark candidate is registered. To this end, the landmark candidate initializing unit 234 determines the corner point included in each pair for which it is recognized through the result compared by the first comparing unit 222 that the distance between the corner point and the searched landmark or landmark candidate is greater than the first pre-determined distance, as a new landmark candidate and registers information about the determined new landmark candidate as landmark candidate information. In addition, the landmark candidate initializing unit 234 determines the corner point included in each pair for which it is recognized through the result compared by the second comparing unit 226 that the distance between the LFDs is greater than the second predetermined distance as a new landmark candidate and registers information about the determined new landmark candidate as landmark candidate information. Here, a landmark candidate flag included in landmark candidate information registered as the new landmark candidate is initialized to 0.

For example, if it is recognized that the corner points 308, 314, and 304 respectively included in the pairs 272, 276, and 278 shown in FIG. 18 have not been used to generate both landmarks and landmark candidates in a previous upper image, the corner points 308, 304, and 314 are determined as a new landmark candidate and landmark candidate information about the determined landmark candidates 304, 308, and 314 is registered. For example, if it is recognized that the distance between the corner point 308 and the landmark candidate 312 included in the pair 272 shown in FIG. 18 is greater than the first predetermined distance or the distance between the LFD of the corner point 308 and the LFD of the landmark candidate 312 is greater than the second predetermined distance, the corner point 308 is determined as a new landmark candidate, and the landmark candidate information about the determined landmark candidate 308 is registered.

After operation 58, in operation 60, the landmark candidate processing unit 40 removes overlapping landmark candidates from the landmark candidates registered by the observing and registering unit 38, estimates a three-dimensional image coordinate from a two-dimensional image coordinate of non-overlapping landmark candidates, and outputs the non-overlapping landmark candidates having the estimated three-dimensional image coordinate to the landmark registering unit 42. In this case, each coordinate of the registered landmark candidates inputted into the landmark candidate processing unit 40 from the observing and registering unit 38 is a two-dimensional coordinate expressed in the image coordinate system.

Figure 19:
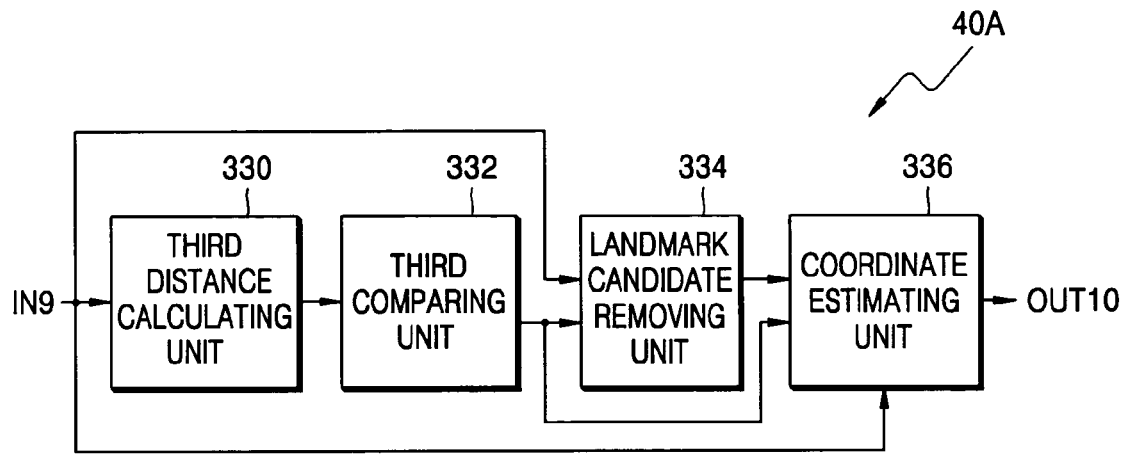
FIG. 19 is a block diagram of an example of a landmark candidate processing unit shown in FIG. 3.

FIG. 19 is a block diagram of an example 40A of the landmark candidate processing unit 40 shown in FIG. 3. The landmark candidate processing unit 40A of FIG. 19 includes a third distance calculating unit 330, a third comparing unit 332, a landmark candidate removing unit 334, and a coordinate estimating unit 336.

Figure 20:
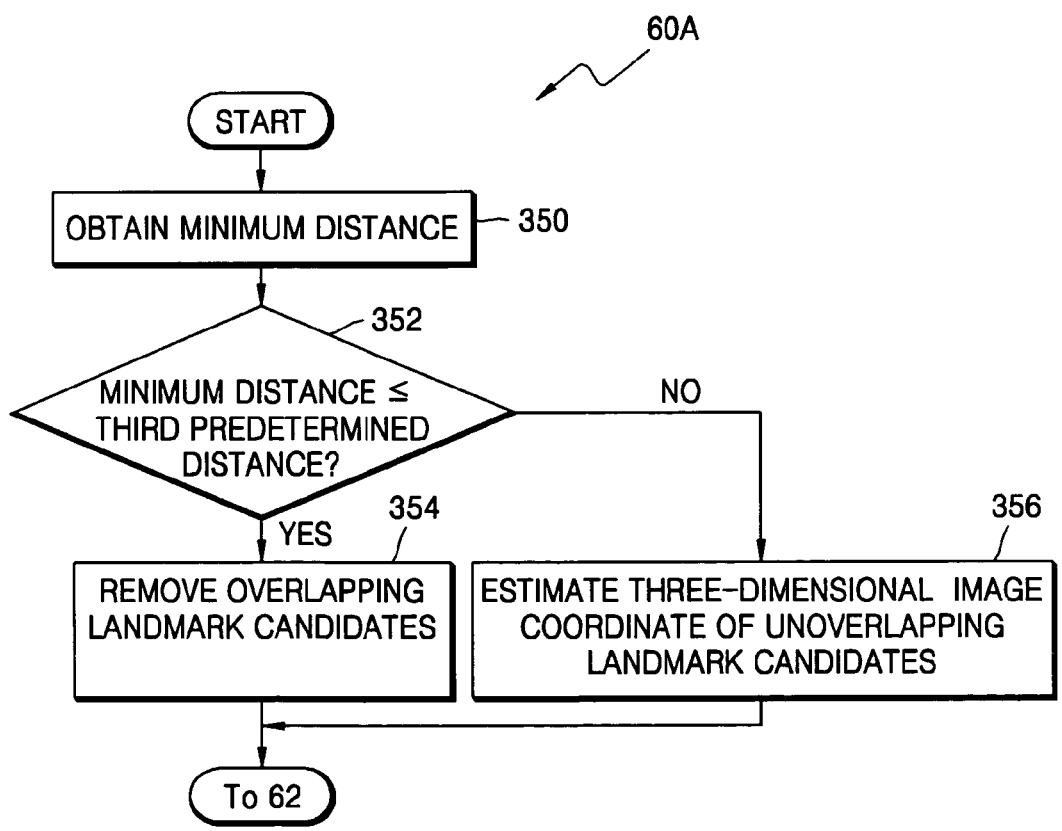
FIG. 20 is a flowchart illustrating an example of operation 60 shown in FIG. 4.

FIG. 20 is a flowchart illustrating an example 60A of operation 60 shown in FIG. 4. Operation 60A of FIG. 20 includes removing an overlapping landmark candidate or estimating a three-dimensional coordinate of an non-overlapping landmark candidate according to the result of comparing a minimum distance with a third predetermined distance (respective operations 350 through 356).

Referring to FIGS. 4, 19, and 20, after operation 58, in operation 350, the third distance calculating unit 330 calculates a minimum distance between one registered landmark candidate and another registered landmark candidate that is the nearest to the registered landmark candidate and outputs the calculated minimum distance to the third comparing unit 332, from each of the registered landmark candidates inputted through an input terminal IN9 from the observing and registering unit 38.

After operation 350, in operation 352, it is determined whether the minimum distance is equal to or smaller than the third predetermined distance. To this end, the third comparing unit 332 compares each minimum distance inputted from the third distance calculating unit 330 with the third predetermined distance and outputs compared results to the landmark candidate removing unit 334. According to the present invention, the third predetermined distance may be set to a 5-pixel distance.

In operation 354, it is determined through the result compared by the third comparing unit 332 that landmark candidates having a minimum distance equal to or smaller than the third predetermined distance are overlapped with one another, and the landmark candidate removing unit 334 removes the overlapping landmark candidates from the landmark candidates inputted from the observing and registering unit 38 through an input terminal IN9.

For example, when the corner points 308, 304, and 314 shown in FIG. 18 are determined as new landmark candidates and landmark candidate information about the determined landmark candidates 308, 304, and 314 is registered by the observing and registering unit 38, if a minimum distance between the corner points 308 and 304 is equal to or smaller than the third predetermined distance, one of the new landmark candidates 308 and 304 is removed.

In operation 356, however, it is determined that the landmark candidates having the minimum distance greater than the third predetermined distance are not overlapped with one another and the three-dimensional image coordinates of the non-overlapping landmark candidates expressed by two-dimensional coordinates in the image coordinate system are estimated from the two-dimensional coordinates using a trigonometrical relationship, for example. To this end, according to an embodiment of the present invention, it is recognized through the result compared by the third comparing unit 332 that landmark candidates having the minimum distance greater than the third predetermined distance are not overlapped with one another, and the coordinate estimating unit 336 estimates three-dimensional image coordinates of non-overlapping landmark candidates inputted through an input terminal IN9 from the observing and registering unit 38 and outputs the landmark candidate having the estimated three-dimensional image coordinate to the landmark registering unit 42 through an output terminal OUT10. Alternatively, according to another embodiment of the present invention, if the landmark candidate removing unit 334 outputs only a landmark candidate that has not been removed from the landmark candidates inputted from the observing and registering unit 38 through an input terminal IN9, to the coordinate estimating unit 336, the coordinate estimating unit 336 inputs the landmark candidates that have not been removed from the landmark candidate removing unit 334, from the landmark candidate removing unit 334, estimates a three-dimensional image coordinates of the inputted and non-overlapping landmark candidates, and outputs the landmark candidate having the estimated three-dimensional coordinates to the landmark registering unit 42 through an output terminal OUT10.

As described above, if the location predicting unit 134 shown in FIG. 11 predicts by using the optical flow tracker locations of a landmark and a landmark candidate that may exist in the current upper image, the coordinate estimating unit 336 shown in FIG. 19 can more easily estimate three-dimensional image coordinates from a two-dimensional coordinate track of the non-overlapping landmark candidates, and a location and an azimuth angle of the mobile body.

Figure 21:
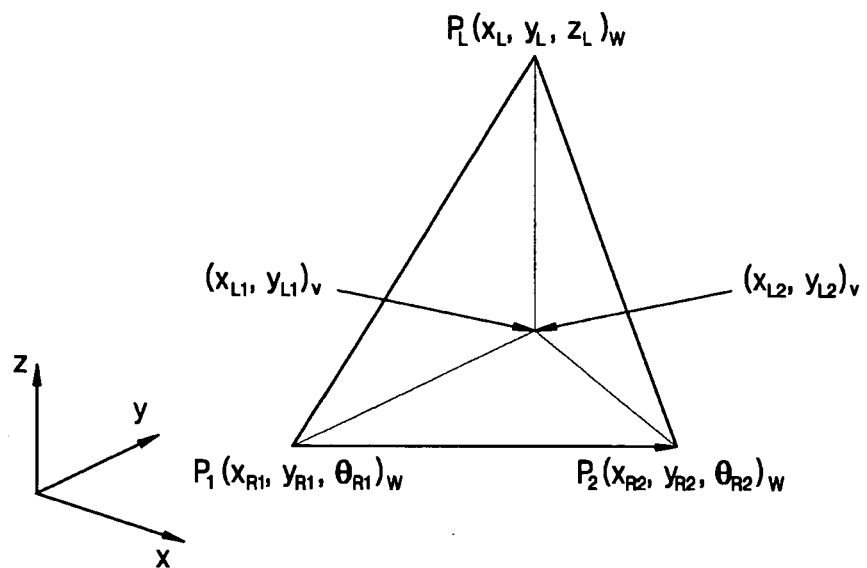
FIG. 21 is a drawing for understanding an operation of extracting height information using a trigonometrical relationship in the coordinate estimating unit shown in FIG. 19.

FIG. 21 illustrates coordinates of locations $P_1$, $P_2$, and $P_L$ in a world coordinate system for a better understanding of height information used in the coordinate estimating unit 336 shown in FIG. 19.

Referring to FIGS. 19-21, the location and azimuth angle of the mobile body at location $P_1$, are expressed as $(x_{R1}, y_{R1}, \theta_{R1})_w$, and the location and azimuth angle of the mobile body at location $P_2$ are expressed as $(x_{R2}, y_{R2}, \theta_{R2})_w$. If the landmark $P_L$ is placed in $(x_L, y_L, \theta_L)_w$ on a world coordinate system and it is observed using the upper image at each of location $P_1$ and $P_2$, $(x_{L1}, y_{L1})_v$ and $(x_{L2}, y_{L2})_v$ can be obtained in each image coordinate system. The relationship between the image coordinate system and the world coordinate system is shown in FIG. 13. Even though the location of the mobile body changes to $P_2$ from $P_1$ in the world coordinate system, the landmark in the world coordinate system is expressed as the same point $(x_L, y_L, \theta_L)w$, and the coordinate of the landmark at $P_1$ in the image coordinate system is expressed as $(x_{L1}, y_{L1})v$ and the coordinate of the landmark at $P_2$ in the image coordinate system is expressed as $(x_{L2}, y_{L2})v$. A point in the image coordinate system is a point in which the landmark $P_L$ is projected onto a plane photographed by a robot camera. In this case, the coordinate estimating unit 336 can estimate the height of an actual landmark candidate placed at the location $P_L$ using a trigonometrical relationship from the distance between the location $P_1$ and the location $P_2$ of the mobile body and the angles $\theta_{R1}$ and $\theta_{R2}$ and values $(x_{L1}, y_{L1})_v$ and $(x_{L2}, y_{L2})_v$ on a landmark obtained from each image coordinate system.

Figure 22:
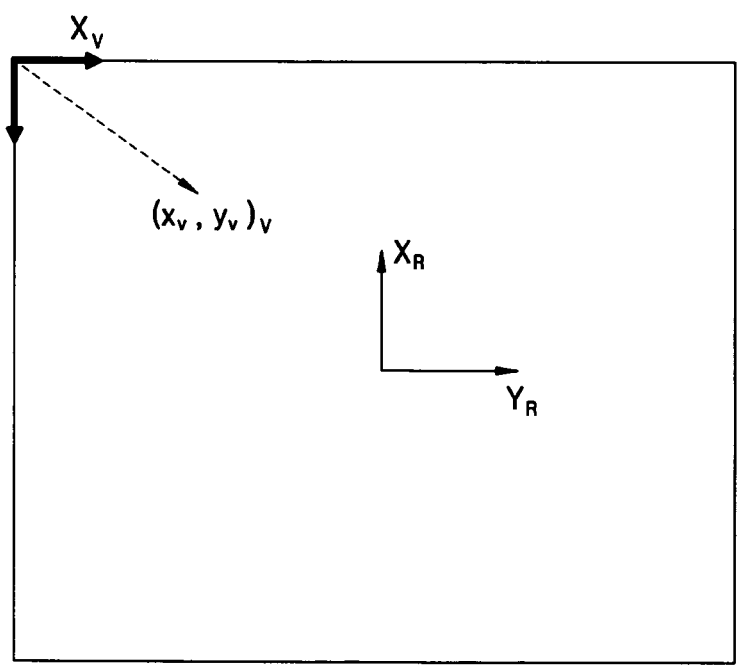
FIG. 22 illustrates an example in which an image coordinate is converted into a mobile body coordinate.
Figure 23:
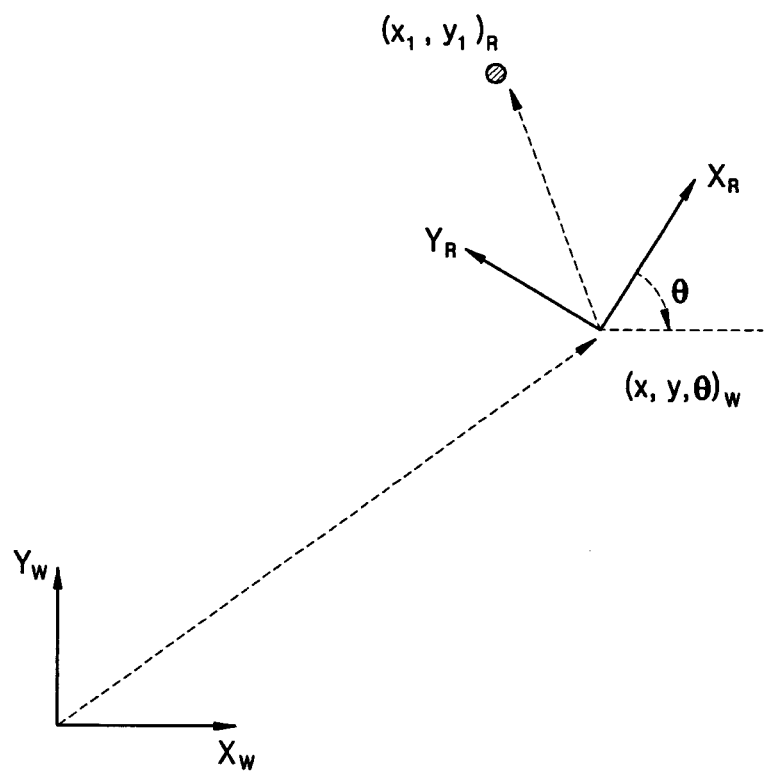
FIG. 23 illustrates an example in which a mobile-body coordinate system is converted into a world coordinate system.

FIG. 22 illustrates an example of changing image coordinates from the image coordinate system into the mobile-body coordinate system, and FIG. 23 illustrates an example of changing mobile body coordinates from the mobile-body coordinate system into the world coordinate system.

Referring to FIGS. 19, 22 and 23, the coordinate estimating unit 336 converts two-dimensional coordinates of a landmark candidate in the image coordinate system into the mobile-body coordinate systems, as shown in Equation 6.

$$\begin{bmatrix} x_v \\ y_v \\ 1 \end{bmatrix}_R = \begin{bmatrix} 0 & -s_y & s_y o_y \\ s_x & 0 & -s_x o_x \\ 0 & 0 & 1 \end{bmatrix} \begin{bmatrix} x_v \\ y_v \\ 1 \end{bmatrix}_v \quad (6)$$

where $$\begin{bmatrix} x_v \\ y_v \\ 1 \end{bmatrix}_R$$

is a two-dimensional coordinate of the landmark candidate expressed in the mobile-body coordinate system, and $$\begin{bmatrix} x_v \\ y_v \\ 1 \end{bmatrix}_V$$

is a two-dimensional coordinate of a landmark candidate expressed in the image coordinate system, $o_x$ and $o_y$ are optical center coordinates in a vision coordinate system, and $s_x$ and $s_y$ are scale factors in each direction in the vision coordinate system.

In Equation 6, $$\begin{bmatrix} 0 & -s_y & s_y o_y \\ s_x & 0 & -s_x o_x \\ 0 & 0 & 1 \end{bmatrix}$$

may be expressed as a transform matrix $T_V^R$, as shown in Equation 7.

$$T_V^R = \begin{bmatrix} s_x & 0 & 0 \\ 0 & s_x & 0 \\ 0 & 0 & 1 \end{bmatrix} \begin{bmatrix} \cos(90°) & -\sin(90°) & 0 \\ \sin(90°) & \cos(90°) & 0 \\ 0 & 0 & 1 \end{bmatrix} \begin{bmatrix} 1 & 0 & -o_x \\ 0 & 1 & -o_y \\ 0 & 0 & 1 \end{bmatrix} \quad (7)$$

Next, the coordinate estimating unit 336 converts the two-dimensional coordinate of the landmark candidate in the mobile-body coordinate system into the world coordinate system, as shown in Equation 8.

$$\begin{bmatrix} x_1 \\ y_1 \\ 1 \end{bmatrix}_W = T_R^W \begin{bmatrix} x_1 \\ y_1 \\ 1 \end{bmatrix}_R, \quad (8)$$

where $$\begin{bmatrix} x_1 \\ y_1 \\ 1 \end{bmatrix}_R$$

is a two-dimensional coordinate of a landmark candidate expressed in the mobile-body coordinate system, $$\begin{bmatrix} x_1 \\ y_1 \\ 1 \end{bmatrix}_W$$

is a two-dimensional coordinate of a landmark candidate expressed in the world coordinate system, and $T_R^W$ may be expressed as a transform matrix as shown in Equation 9.

$$T_R^W = \begin{bmatrix} \cos(\theta) & -\sin(\theta) & x \\ \sin(\theta) & \cos(\theta) & y \\ 0 & 0 & 1 \end{bmatrix} \quad (9)$$

As a result, the coordinate estimating unit 336 can obtain a three-dimensional coordinate in the world coordinate system of the landmark candidate as shown in Equation 10.

$$X_L = (H^T H)^{-1} H^T X_R \quad (10),$$

where $X_L$ is a three-dimensional coordinate in the world coordinate system of the landmark candidate and expressed as shown in Equation 11, $X_R$ is a two-dimensional coordinate in the image coordinate system of the landmark candidate and expressed as shown in Equation 12, T is a matrix transpose, and H is expressed as in Equation 13 and may be induced from Equation 14 that shows the coordinate conversion relationship and Equation 15 that shows a trigonometrical relationship.

$$X_L = \begin{bmatrix} x_1 \\ y_1 \\ z_1 \end{bmatrix} \quad (11)$$

$$X_R = \begin{bmatrix} x_{R1} \\ y_{R1} \\ \vdots \\ x_{RN} \\ y_{RN} \end{bmatrix} \quad (12)$$

$$H = \begin{bmatrix} 10 & \frac{-(x'_{11} - x_{R1})}{f} & 10 & \frac{-(x'_{1N} - x_{RN})}{f} \\ \vdots & & & \\ 01 & \frac{-(y'_{11} - y_{R1})}{f} & 01 & \frac{-(y'_{1N} - y_{RN})}{f} \end{bmatrix} \quad (13)$$

$$\begin{bmatrix} x_{11} \\ y_{11} \end{bmatrix}_V \rightarrow \begin{bmatrix} x'_{11} \\ y'_{11} \end{bmatrix}_W \quad (14)$$

$$\begin{bmatrix} x_{1N} \\ y_{1N} \end{bmatrix}_V \rightarrow \begin{bmatrix} x'_{1N} \\ y'_{1N} \end{bmatrix}_W$$

$$\frac{z_1}{f} \begin{bmatrix} x'_{11} - x_{R1} \\ y'_{11} - y_{R1} \end{bmatrix}_W = \begin{bmatrix} x_1 - x_{R1} \\ y_1 - y_{R1} \end{bmatrix}_W \quad (14)$$

$$\frac{z_1}{f} \begin{bmatrix} x'_{1N} - x_{RN} \\ y'_{1N} - y_{RN} \end{bmatrix}_W = \begin{bmatrix} x_1 - x_{RN} \\ y_1 - y_{RN} \end{bmatrix}_W. \quad (15)$$

According to an embodiment of the present invention, the landmark generating unit 10 shown in FIG. 3 may not include the landmark candidate processing unit 40. In this case, operation 20 shown in FIG. 4 may not include operation 60.

Referring to FIGS. 3 and 4, after operation 60, in operation 62, the landmark registering unit 42 registers the landmark candidate that has been observed as a corner point more than a predetermined number of times among the landmark candidates as a landmark, outputs the registered landmark through an output terminal OUT3, and outputs landmark candidate information about the landmark candidate observed as the corner point less than the predetermined number of times among the landmark candidates to the landmark and landmark candidate predicting unit 34. Here, the predetermined number may be set to 5, for example. In operation 62, the landmark registering unit 42 registers a new landmark by increasing the size of a covariance matrix of an extended Kalman filter (EKF), inserting a related-landmark location into a submatrix of the covariance matrix, and inserting related-landmark noise into a noise covariance matrix.

After operation 20, in operation 22, the location and map operation unit 12 estimates the location of the mobile body using landmark information inputted from the landmark generating unit 10 and, simultaneously, generates an environment of a map of the mobile body, outputs the estimated location and the generated map through an output terminal OUT1, and outputs the landmark information and the location and the azimuth angle of the mobile body to the landmark generating unit 10, that is, to the landmark and landmark candidate predicting unit 34 shown in FIG. 3. To this end, the apparatus for estimating the location and generating the environment map of the mobile body shown in FIG. 1 may further include an odometry processing unit 14.

Here, the odometry processing unit 14 controls an odometry of the mobile body and outputs information about the odometry to the location and map operation unit 12. Here, the information about the odometry may be a sensor value obtained from encoders (not shown) respectively attached to right and left wheels of the mobile body.

In this case, the location and map operation unit 12 estimates the location of the mobile body from the information about the odometry inputted from the odometry processing unit 14 and landmarks inputted from the landmark generating unit 10 and simultaneously, generates an environment map of the mobile body, and outputs information about the landmark to the landmark generating unit 10.

According to an embodiment of the present invention, the location and map operation unit 12 may be implemented by a simultaneous localization and map building (SLAM) operation unit (not shown) which recognizes the location of the mobile body using the landmarks and, simultaneously, generates a map of the landmarks using an EKF.

The above-described procedure for registering a new landmark in the landmark registering unit 42 shown in FIG. 3 and the location and map operation unit 12 shown in FIG. 1 are disclosed by M. W. M. Gamini Dissanayake, Paul Newman, Steven Clark, Hugh F. Durrant-Whyte, and M. Csorba in the paper entitled "A Solution to the Simultaneous Localization and Map Building (SLAM) Problem", IEEE Trans. on Robotics and Automation. Vol. 17, No. 3, June 2001.

SLAM updating performed by the location and map operation unit 12 will now be described with reference to FIGS. 24 and 25.

EKF-based SLAM includes a theoretical proof about a general methodology and an SLAM technique but does not include a series of methods, for example, a motion model and an observation model proposed by the present invention. That is, the performance of the location of the mobile body and azimuth angle operation and map generation is improved using the landmark generating unit 10 shown in FIG. 1, compared to a general EKF-based SLAM technique.

Figure 24:
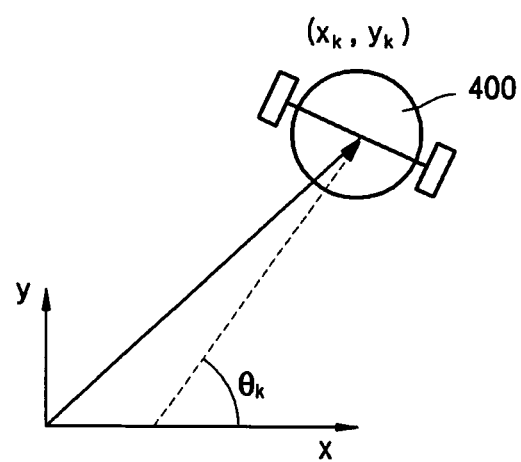
FIG. 24 is a diagram for explaining a processing model.

FIG. 24 is a diagram for explaining a processing model, which illustrates a coordinate $(x_k, y_k)$ of a mobile body 400 in a world coordinate system. Here, a vehicle processing model, that is, a location model of the mobile body 400 is expressed as shown in Equation 16, and a landmark processing model, that is, a model of a map may be expressed as shown in Equation 17.

$$x_{k+1} = x_k + T v \cos(\theta_k)$$

$$y_{k+1} = y_k + T v \sin(\theta_k)$$

$$\theta_{k+1} = \theta_k + T w \tag{16},$$

where $(x_k, y_k, \theta_k)$ is the location and angle of the mobile body in a previous upper image in a world coordinate system, $(x_{k+1}, y_{k+1}, \theta_{k+1})$ is the location and angle of the mobile body in a current upper image in the world coordinate system, v is the linear velocity of the mobile body, w is the angular velocity of the mobile body, and T is a sampling time.

$$\begin{bmatrix} x_i(k+1) \\ y_i(k+1) \end{bmatrix} = \begin{bmatrix} x_i(k) \\ y_i(k) \end{bmatrix}. \tag{17}$$

Figure 25:
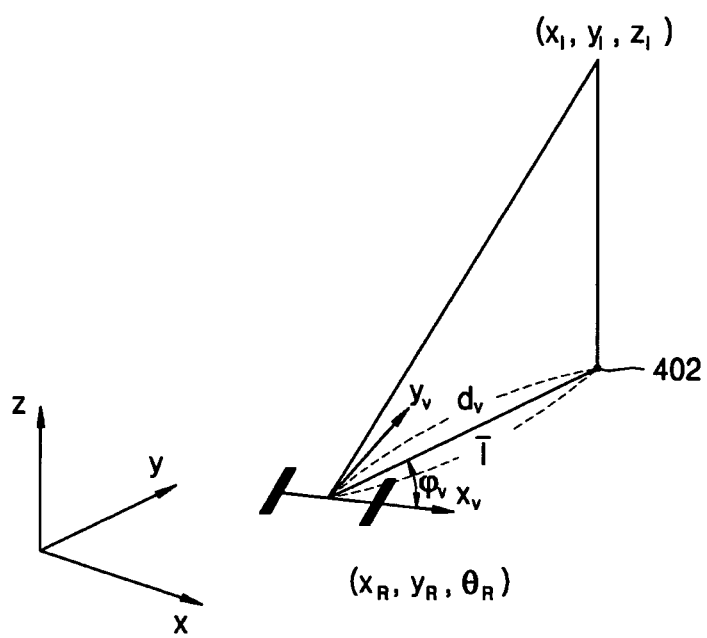
FIG. 25 is a diagram for explaining an observation model.

FIG. 25 is a diagram for explaining an observation model. x, y, and z are the axes of the world coordinate system, $x_v$ and $y_v$ are the axes of the image coordinate system, $(x_l, y_l, z_l)$ is a coordinate of a landmark in the world coordinate system, and $(x_R, y_R$ and $\theta_R)$ is a coordinate of the landmark in the mobile-body coordinate system.

Referring to FIG. 25, a distance $d_v$ between central points $(x_v, y_v, z_v)$ and a point 402 on the image coordinate system may be expressed as shown in Equation 18, and an angle $\psi_v$ formed by vector $^Z$ between the axis $x_v$ and the point 402 in the image coordinate system may be expressed as shown in Equation 19.

$$d_v = \sqrt{(x_R - x_L)^2 + (y_R - y_l)^2} \frac{f}{z_l}, \tag{18}$$

where f is a scale factor representing a focal length of a camera lens.

$$\Psi = \tan^{-1}\left(\frac{y_R - y_l}{x_R - x_l}\right) - \theta_R \tag{19}$$

By referring to the processing model obtained using Equations 16 and 17, the observation model obtained using Equation 19, the method disclosed by M. W. M. Gamini Dissanayake, Paul Newman, Steven Clark, Hugh F. Durrant-Whyte, and M. Csorba in the paper entitled "A Solution to the Simultaneous Localization and Map Building (SLAM) Problem", IEEE Trans. on Robotics and Automation. Vol. 17, No. 3, June 2001 and the above-described embodiments, embodiments of the present invention can be implemented by those skilled in the art.

The above-described embodiments of the present invention can be written as a program in a computer readable recording medium and executed in a computer. Examples of the computer readable recording medium include magnetic storage media (such as read-only memory (ROM), floppy disks or hard disks), optical readable media (such as CD ROMs or DVDs etc.), and carrier waves (such as data transmission through the Internet).

Using the computer program stored on the computer readable recording medium, corner points in an upper image obtained by taking a picture in an upper vertical direction in the environment in which a mobile body is placed are observed, landmarks are generated from the observed corner points, the location of the mobile body is estimated from the landmarks, and an environment map of the mobile body is generated.

In generating a landmark, corner points that have been used to generate landmarks or landmark candidates in a previous upper image are observed and searched, a corner point that has not been used as a landmark or a landmark candidate in the previous upper image is registered as a new landmark candidate, and landmark candidates that have been observed as a corner point more than a predetermined number of times among landmark candidates, are registered as a landmark, using at least one of coordinates of corner points that indicate corner in the current upper image and LFDs that classify corner points. In this case, registering of the landmark includes obtaining an image in an upper vertical direction of the environment in which the mobile body is placed, buffering the obtained image and determining the buffered result as a previous upper image, extracting at least one of coordinates of the corner points of the current upper image and LFDs as image feature information, predicting a landmark and a landmark candidate in the previous upper image from the current upper image, comparing information about the predicted landmark and landmark candidate with image feature information, observing corner points that have been used to generate landmarks or landmark candidates in the previous upper image among the corner points using the compared result, registering a corner point that has not been used to generate a landmark or a landmark candidate in the previous upper image as a new landmark candidate, and registering landmark candidates that have been observed as a corner point more than a predetermined number of times among the landmark candidates, as a landmark.

The obtaining of the image includes obtaining an image in an upper vertical direction of the environment in which the mobile body is placed and correcting distortion of the obtained upper image. The obtaining of the image further includes low-pass-filtering the distortion-calibrated result. Alternatively, the obtaining of the image includes obtaining an image in the upper vertical direction of the environment in which the mobile body is placed and low-pass-filtering the obtained upper image. The extracting of the image feature information includes detecting corner points from the current upper image, obtaining coordinates of the detected corner points, analyzing images around the detected corner points and obtaining an LFD at each of the corner points using the analyzed result. The predicting of the locations of the landmark and landmark candidate from the current upper image includes converting three-dimensional coordinates of the locations of the registered landmark and landmark candidate in the previous upper image using the location and azimuth angle of the mobile body when the previous upper image is inputted based on the image coordinate system of the previous upper image, selecting only a landmark and a landmark candidate that belong to the previous upper image among the landmarks and landmark candidates having the converted two-dimensional coordinate, and calculating the amount of variation between the current upper image and the previous upper image from the selected result and predicting a landmark and a landmark candidate that may exist in the current upper image, using the calculated amount of variation.

The observing of the corner points and registering of the new landmark candidate includes searching for the predicted and the nearest landmark or landmark candidate to the corner point with respect to each of the corner points, determining whether the distance between the corner point and the searched landmark or landmark candidate is equal to or smaller than the first predetermined distance, with respect to each of the corner points, determining whether the distance between the LFD of the corner point and the LFD of the searched landmark or landmark candidate is equal to or smaller than the second predetermined distance, with respect to each of the corner points in which the distance between the searched landmark or landmark candidate is equal to or smaller than the first predetermined distance, if it is determined that the distance between the LFD of the corner point and the LFD of the searched landmark or landmark candidate is equal to or smaller than the second predetermined distance, determining whether the landmarks or landmark candidates exist at the nearest location to the corner point, if it is determined that the landmark exists at the nearest location to the corner point, counting a landmark flag that indicates how many times a landmark has been observed, in an ascending series, if it is determined that the landmark candidate exists at the nearest location to the corner point, counting a landmark candidate flag that indicates the number in which a landmark candidate has been observed, in an ascending series, determining a corner point more distant from the searched landmark or landmark candidate than the first predetermined distance or a corner point having the LFD more distant from the LFD of the searched landmark or landmark candidate than the second predetermined distance as a new landmark candidate, and registering information about the determined new landmark candidate.

The registering of the landmark further includes removing overlapping landmark candidates from the registered landmark candidates and estimating a three-dimensional image coordinate from the two-dimensional image coordinate of the non-overlapping landmark candidates. The estimating of the image coordinate includes obtaining a minimum distance between the nearest landmark candidates with respect to the registered landmark candidates, determining whether the minimum distance is equal to or smaller than the third predetermined distance, determining the landmark candidates having the minimum distance equal to smaller than the third predetermined distance to be overlapped with one another and removing the overlapping landmark candidates, determining the landmark candidates having the minimum distance greater than the third predetermined distance not to be overlapped with one another, and estimating a three-dimensional image coordinate of the non-overlapping landmark candidates.

The result of testing the location and azimuth angle of a mobile body using the apparatus and method according to the present invention and the computer readable recording medium for storing a computer program for controlling the apparatus according to the present invention will now be described with reference to the accompanying drawings.

First, the result obtained by dividing the sum of distance errors at each location of the mobile body into a total number of samples is defined as a distance mean error, and the result obtained by dividing the sum of azimuth angle errors at each location of the mobile body into a total number of samples is defined as an azimuth angle mean error. In order to calculate the errors, first, the initial location where the mobile body starts learning is set to the origin of the world coordinate system, and the moving direction of the mobile body at the initial location coincides with a direction of an x-axis of the world coordinate system. In this case, when the actual location and azimuth angle of the mobile body are $(x_d, y_d, \theta_d)$ and the measured location and azimuth angle of the mobile body are $(x, y, \theta)$, a distance error $e_d$ may be expressed in cm as shown in Equation 20, and an azimuth angle error $e_\theta$ may be expressed in degrees as shown in Equation 21.

$$e_d = \sqrt{(x_d-x)^2 + (y_d-y)^2} \tag{20}$$

$$e_\theta = |\theta_d - \theta| \tag{21}$$

When the environment in which the mobile body moves is a living room of an apartment, a path of the living room on which the mobile body is to move is determined previously, the mobile body automatically moves along the path, the map of the living room is generated in real-time and the location of the mobile body is recognized. In this case, the mobile body moves to a predetermined number of points on the path, for example, 15 points, and then, the location and azimuth angle of the mobile body are measured a predetermined number of times at each point, for example, three times. In this case, a distance error and an azimuth angle error between the calculated locations and azimuth angles and the measured locations and azimuth angles are obtained as a predetermined number of samples, for example, 45 samples.

Figure 26:
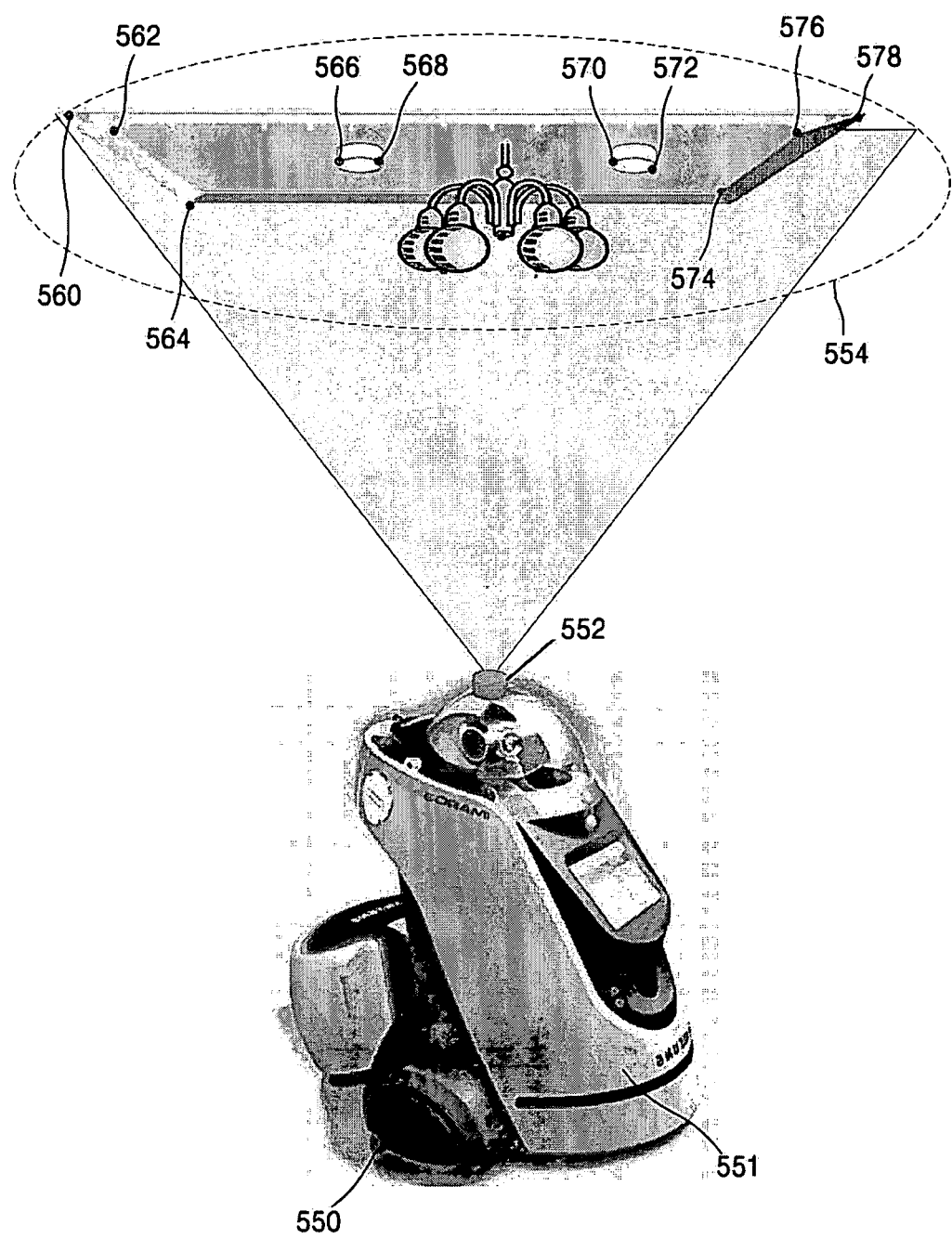
FIG. 26 shows the appearance of a mobile body to be tested.

FIG. 26 shows the appearance of a mobile body to be tested, which illustrates a wheel driving unit 550, a robot 551, an upper image camera 552, and a ceiling 554. Here, the image feature information extracting unit 36 shown in FIG. 3 can detect a plurality of corner points 560 to 578 from the ceiling 554.

The wheel driving unit 550 shown in FIG. 26 performs the function of the odometry processing unit 14 shown in FIG. 1, and the upper image camera 552 may be embedded in the image obtaining unit 30 shown in FIG. 3.

Figure 27A:
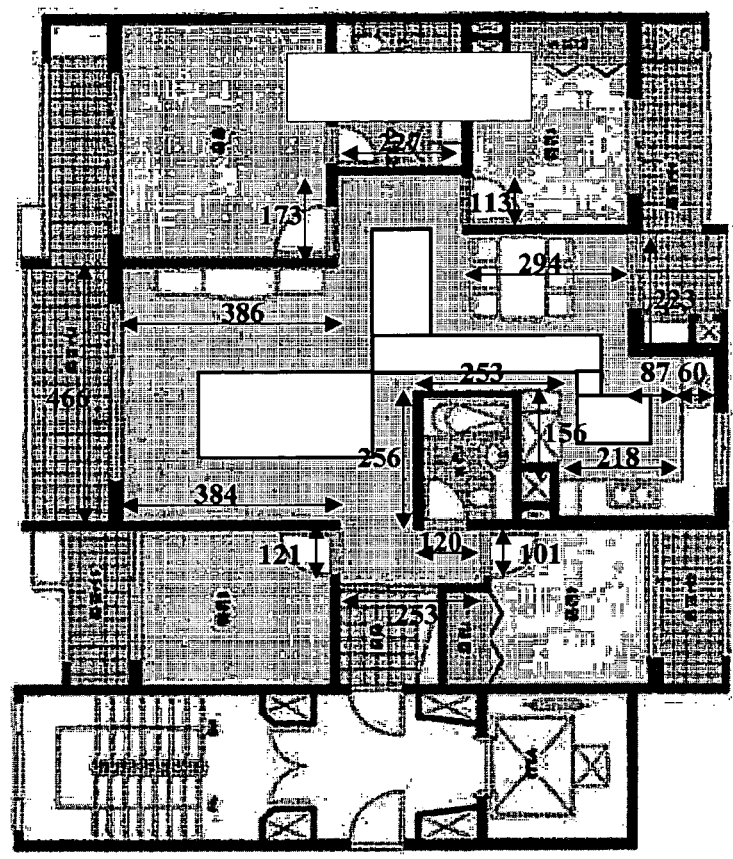
FIGS. 27A and 27B are exemplary drawings illustrating a path on which the robot is to be moved.
Figure 27B:
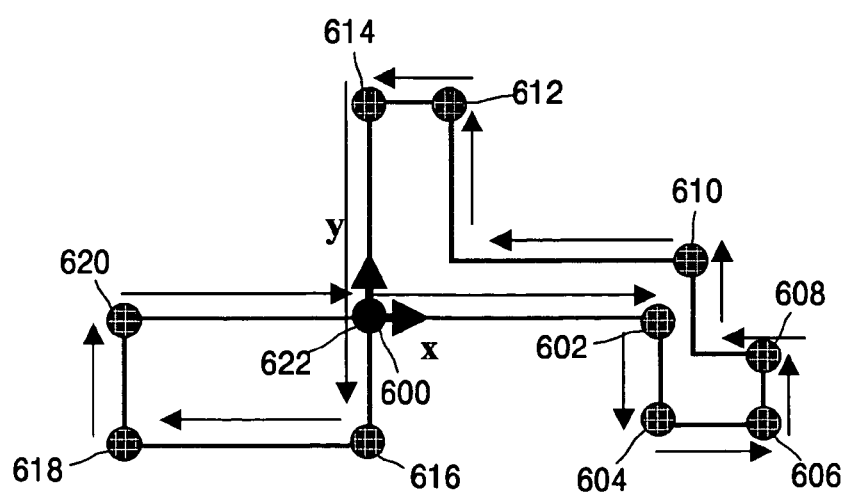

FIGS. 27A and 27B are exemplary drawings illustrating a path on which the mobile body is to move. FIG. 27A is a plane view of an apartment including a living room of the apartment where the robot travels, and FIG. 27B is an exemplary drawing of an odometry path of the robot. In FIG. 27A, the dimensions of the apartment are shown in mm. The path shown in FIG. 27B is in the world coordinate system.

In the living room shown in FIG. 27A, the robot automatically learns the map along the path in the directions of the arrows shown in FIG. 27B. In this case, the robot starts learning from learning starting points (0,0)(600) shown in FIG. 27B. In this case, the coordinate values of the robot is obtained through actual measurement from the world coordinate system at each of points 602 to 622 shown in FIG. 27B and after the learning is completed, the location and azimuth angle error are measured at the points.

The locations and azimuth angles of the mobile body are measured using a ruler and a protractor in the following order.

Figure 28:
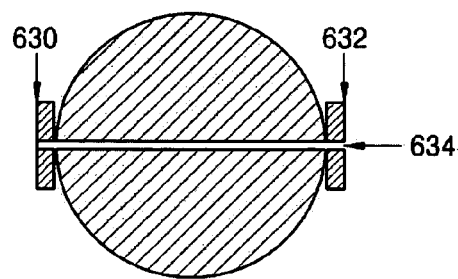
FIG. 28 shows the appearance of the robot.

FIG. 28 shows an appearance of the robot 551, and FIGS. 29A through 29D illustrate operations of measuring of the location and azimuth angle of the robot 551.

Figure 29A:
FIGS. 29A through 29D illustrate a figure for measuring the location of the robot.
Figure 29B:
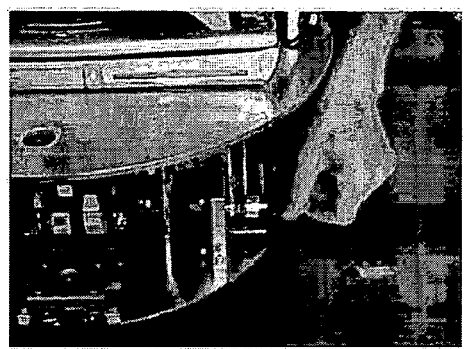
Figure 29C:
Figure 29D:

First, when the robot 551 is at a test point, for example, one of the points 602 to 622 shown in FIG. 27B and then points where a wheel axis 634 of the robot 551 and outer surfaces 630 and 632 of right and left wheels cross with one another are projected towards the ground, a point that crosses with the ground is as shown in FIGS. 29A and 29B. After the robot 551 moves to a next point, and a segment that connects two points indicated on the ground is drawn, as shown in FIG. 29C, a distance between a central point of the segment and an original point is set to a distance of the robot 551 and an angle formed by the segment and a reference line of the ground is set to an angle of the robot 551, as shown in FIG. 29D.

FIG. 30 illustrates an example of measurement data when 45 sample data are obtained by measuring locations and azimuth angles of the mobile body at each of the 15 points three times using the above-described measuring method.

Figure 31:
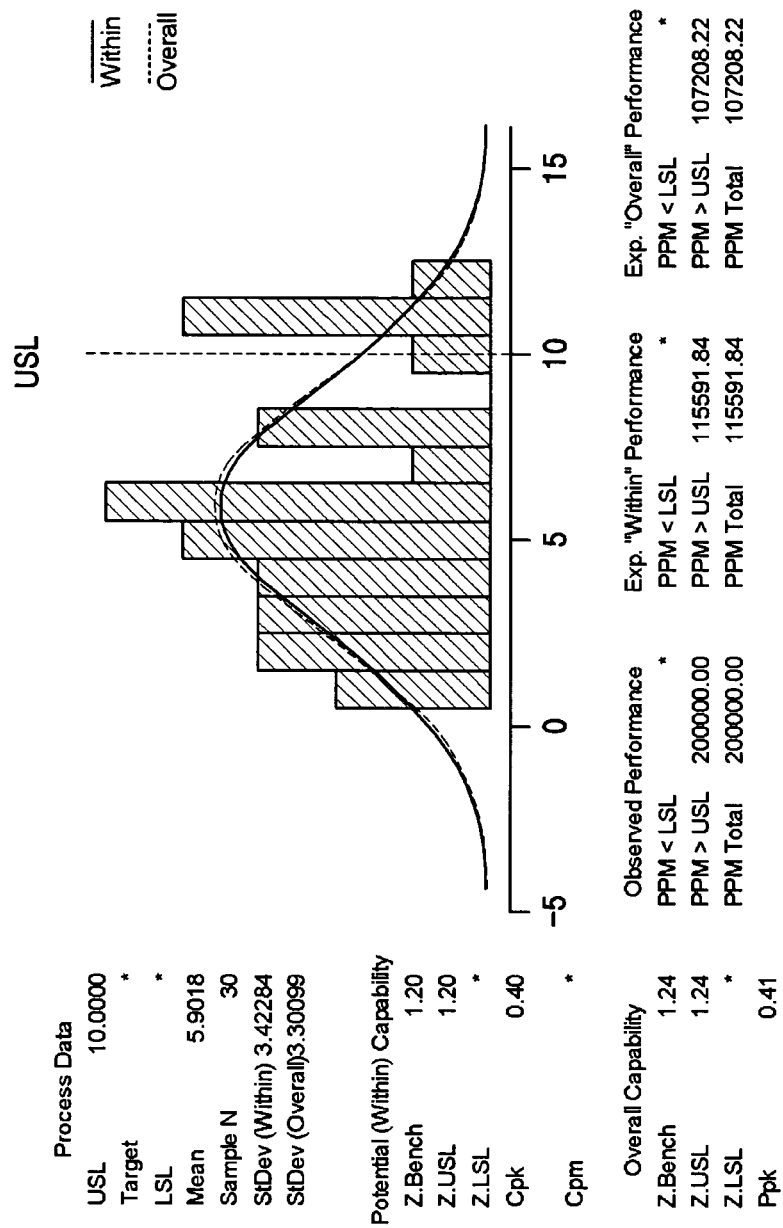
FIG. 31 is a diagram for explaining a statistical analysis result of a distance error obtained in FIG. 30, obtained using a data analysis program called Minitab.

FIG. 31 is a diagram for explaining a statistical analysis result of a distance error obtained in FIG. 30, obtained using the data analysis program called Minitab when an upper specification limit (USL) is 10 cm. The vertical axis represents a probability distribution and the horizontal axis represents a range of a distance error.

In this case, a mean distance error Mean with respect to 30 observation data number Sample N is 5.9018 cm and a sigma level used to measure the degree of distribution is 2.74 using Z.Bench+1.5 with respect to an overall capability. A sigma level is an index for indicating a defective rate, and a 6-signal level means the level at which 3.4 defects occurs per one million units.

Figure 32:
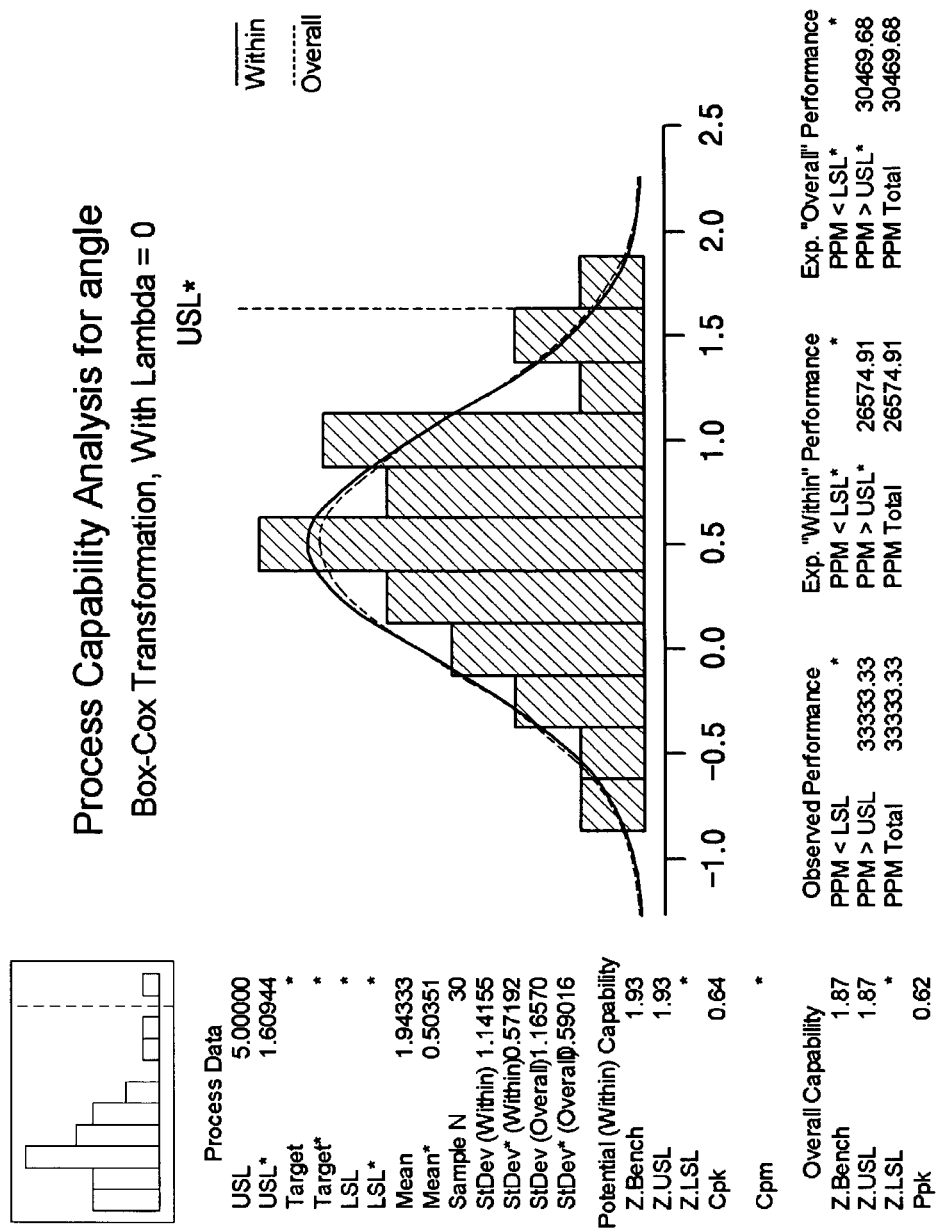
FIG. 32 is a diagram for explaining a statistical analysis result of an azimuth angle error, obtained using the data analysis program called Minitab.

FIG. 32 is a diagram for explaining a statistical analysis result of an azimuth angle error, obtained using a data analysis program called Minitab when an upper specification limit (USL) is 5 degree. The vertical axis represents a probability distribution of observed azimuth angle data and the horizontal axis represents a range of an azimuth angle error.

In this case, a mean distance error Mean with respect to 30 observation data number Sample N is 1.94333 degree and a sigma level used to measure the degree of distribution is 3.43 using Z.Bench+1.5 with respect to an overall capability.

In the apparatus and method for estimating the location of the mobile body and generating the map of the mobile body environment, according to the above-described embodiments of the present invention and the computer readable recording medium storing a computer program for controlling the apparatus according to the present invention, since a natural landmark that is robust to a change of the environment in which the mobile body moves, for example, illumination, etc., is automatically generated from the upper image obtained from the environment in which the mobile body moves, an artificial landmark such as a separate attachment, for example, infrared landmark, a color pattern, etc., estimation of the location of the mobile body and generation of the map of the mobile body environment can be more correctly performed compared to a conventional method. Since a local feature descriptor (LFD) such as an SIFT descriptor that indicates the feature of a corner point is used when the candidate of the landmark is registered again, even though the illumination of an indoor environment in which the mobile body moves varies, a brightness gradient of an image is uniform such that a landmark that is robust to a change of illumination of the mobile body is searched for and registered and estimating the location of the mobile body and generating the map of the mobile body is correctly performed. That is, a mean distance error of the mobile body is maintained within about 6 cm and an azimuth angle mean error is maintained within about 2 degree. Since only one low-priced camera may be used unlike in a conventional method, manufacturing costs of the apparatus can be reduced, and since both an optical flow tracker and an LFD are used, a data problem of a conventional SLAM technique, that is, a large closed loop problem, can be solved and the stability of an EKF-based SLAM technique can be secured.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for estimating a location of a mobile body and generating a map of a mobile body environment using an upper image of the mobile body environment, the apparatus comprising:

a landmark generating unit to observe corner points from the upper image obtained by photographing in an upper vertical direction in the mobile body environment and to respectively generate landmarks from the observed corner points; and a location and map operation unit to estimate the location of the mobile body and to generate the map of the mobile body environment from the landmarks, wherein the landmark generating unit selects one or more landmarks and one or more landmark candidates that belong to a previous upper image, among previously registered landmarks and landmark candidates, predicts locations of the selected landmarks and the selected landmark candidates in a current upper image, and searches for corner points that have been used to respectively generate landmarks or landmark candidates that belong to the previous upper image, among the observed corner points by using coordinates of the corner points that have been observed at the current upper image and local feature descriptors that classify the corner points, and registers the landmark candidate that has been observed as the corner point more than a predetermined number of times among the landmark candidates as a landmark, wherein the landmark candidate is distinguished from the corner point, the landmark and the landmark candidate, wherein the landmark candidate is registered among the corner points that have not been used to generate both the landmark and the landmark candidate in the previous upper image by using the predicted locations of the selected landmarks and the selected landmark candidates, wherein the corner point is registered as the landmark candidate when a distance from the corner point to the landmark or the landmark candidate is greater than a first predetermined distance or when a distance from the local feature descriptor of the corner point and the local feature descriptor of the landmark or the landmark candidate is greater than a second predetermined distance, and wherein the current upper image is an upper image that has been obtained currently and the previous upper image is an upper image that has been obtained previously.

2. The apparatus of claim 1, further comprising an odometry processing unit to control an odometry of the mobile body and to output information about the odometry, wherein the location and map operation unit estimates the location of the mobile body and generates the map of the mobile body environment from the information about the odometry inputted from the odometry processing unit and the landmark inputted from the landmark generating unit and outputs information about the landmark to the landmark generating unit.

3. The apparatus of claim 1, wherein the landmark generating unit comprises:

an image obtaining unit to obtain an image in the upper vertical direction in the mobile body environment;

an image buffer to buffer the obtained image inputted from the image obtaining unit and to output the buffered result as the previous upper image;

an image feature information extracting unit to extract at least one of coordinates of the corner points of the current upper image that has been currently obtained by the image obtaining unit and the local feature descriptors as image feature information;

a landmark and landmark candidate predicting unit to predict the landmark and the landmark candidate in the previous upper image from the current upper image;

an observing and registering unit to compare information about the predicted landmark and landmark candidate with the image feature information, to observe and search for corner points that have been used to respectively generate landmarks or landmark candidates in the previous upper image among the corner points using the compared result, and to register the corner points that have not been used to generate the landmarks or the landmark candidates in the previous upper image as new landmark candidates; and a landmark registering unit to register the landmark candidate that has been observed as the corner point more than a predetermined number of times among the landmark candidates as the landmark.

4. The apparatus of claim 3, wherein the image obtaining unit comprises:

an upper image obtaining unit to obtain an image in the upper vertical direction of the mobile body environment; and a distortion calibrating unit to calibrate a distortion of the obtained upper image.

5. The apparatus of claim 4, wherein the image obtaining unit further comprises a low pass filter to low pass filter the distortion-calibrated result.

6. The apparatus of claim 4, wherein the distortion calibrating unit sets a region of interest in the obtained upper image and calibrates the distortion only in the region of interest.

7. The apparatus of claim 3, wherein the image obtaining unit comprises:

an upper image obtaining unit to obtain an image in the upper vertical direction of the mobile body environment; and a low pass filter to low pass filter the obtained upper image.

8. The apparatus of claim 3, wherein the image feature information extracting unit comprises:

a corner point detecting unit to detect the corner points from the current upper image and to output coordinates of the detected corner points; and a descriptor operation unit to analyze images around the detected corner points and to perform an operation on the local feature descriptors at each of the corner points using the analyzed result.

9. The apparatus of claim 8, wherein the corner point detecting unit determines a point at which a value R is greater than 0 and which becomes a local maximum as the corner point, the value R being given by:

$$R = \det(M) - k(\operatorname{tr}(M))^2$$

wherein tr is a matrix trace, det is a matrix determinant, and M is given by:

$$M = \begin{bmatrix} \left(\frac{\partial I'}{\partial x}\right)^2 & \left(\frac{\partial I'}{\partial x}\right)\left(\frac{\partial I'}{\partial y}\right) \\ \left(\frac{\partial I'}{\partial x}\right)\left(\frac{\partial I'}{\partial y}\right) & \left(\frac{\partial I'}{\partial y}\right)^2 \end{bmatrix}, \text{ and}$$

wherein (x,y) are coordinate in an image coordinate system of the current upper image and I' is a brightness intensity of the current upper image.

10. The apparatus of claim 9, wherein k is 0.04.

11. The apparatus of claim 8, wherein the local feature descriptor on which an operation has been performed by the descriptor operation unit is a scale invariant feature transform descriptor.

12. The apparatus of claim 3, wherein the landmark and landmark candidate predicting unit comprises:

an image coordinate converting unit to convert three-dimensional coordinates of locations of the landmark and the landmark candidate that have been registered in the previous upper image into two-dimensional coordinates based on an image coordinate system of the previous upper image using the location and the azimuth angle of the mobile body when the previous upper image is inputted;

a selecting unit to select only the landmark and the landmark candidate that belong to the previous upper image, among the landmarks and the landmark candidates having the converted two-dimensional coordinates inputted from the image coordinate converting unit; and a location predicting unit to calculate the amount of variation between the current upper image inputted from the image obtaining unit and the previous upper image inputted from the image buffer using the selected result and to predict the landmark and the landmark candidate that may exist in the current upper image using the calculated amount of variation.

13. The apparatus of claim 12, wherein the location predicting unit predicts locations of the landmark and the landmark candidate that may exist in the current upper image using an optical flow tracker.

14. The apparatus of claim 3, wherein the observing and registering unit comprises:
- a landmark and landmark candidate searching unit to search for the nearest landmark or landmark candidate to the corner point, with regard to each of the corner points;
- a first distance calculating unit to calculate a distance between the corner point and the searched landmark or landmark candidate, with regard to each of the corner points;
- a first comparing unit to compare the distance calculated by the first distance calculating unit with a first predetermined distance;
- a second distance calculating unit to calculate a distance between a local feature descriptor of the corner point and a local feature distance of the searched landmark or landmark candidate in response to the result compared by the first comparing unit;
- a second comparing unit to compare the distance calculated by the second distance calculating unit with a second predetermined distance;
- a landmark and landmark candidate identifying unit to identify whether the landmark or the landmark candidate exists at the nearest location to the corner point in response to the result compared by the second comparing unit;
- a counter to count a landmark flag that indicates how many times the landmark has been observed, in an ascending series or counting a landmark flag that indicates how many times the landmark candidate has been observed, in an ascending series, in response to the identified result; and
- a landmark candidate initializing unit to search for the corner points that have not been used to generate the landmark or the landmark candidate in the previous upper image among the corner points as the new landmark candidate and to register information about the new landmark candidate in response to the results compared by the first and second comparing units.

15. The apparatus of claim 3, wherein the landmark generating unit further comprises a landmark candidate processing unit to remove overlapping landmark candidates from the registered landmark candidates and to estimate a three-dimensional image coordinate from a two-dimensional image coordinate of non-overlapping landmark candidates, and
wherein the landmark registering unit registers landmark candidates that have been observed as the corner points more than the predetermined number of times among the non-overlapping landmark candidates as the landmarks.

16. The apparatus of claim 15, wherein the landmark candidate processing unit comprises:
- a third distance calculating unit to calculate a minimum distance between the nearest landmark candidates, with regard to each of the registered landmark candidates;
- a third comparing unit to compare each minimum distance with a third predetermined distance;
- a landmark candidate removing unit to determine whether the landmark candidates are overlapped with one another in response to the result compared by the third comparing unit, and to remove the overlapping landmark candidates in response to the determining result; and
- a coordinate estimating unit to estimate a three-dimensional image coordinate of the non-overlapping landmark candidates, in response to the result compared by the third comparing unit.

17. The apparatus of claim 1, wherein the location and map operation unit estimates the location of the mobile body from the landmarks and generates the map of the mobile body environment using an extended Kalman filter.

18. The apparatus of claim 1, wherein the landmark generating unit registers the landmark candidate or the landmark by using pairs which bind the predicted and nearest landmarks or landmark candidates to the respective corner points.

19. The apparatus of claim 1, wherein the landmark generating unit comprises a landmark and landmark candidate predicting unit to predict the landmark and the landmark candidate in the previous upper image from the current upper image.

* * * * *

UNITED STATES PATENT AND TRADEMARK OFFICE
CERTIFICATE OF CORRECTION

PATENT NO.         : 8,831,872 B2                                    Page 1 of 1
APPLICATION NO.    : 11/331058
DATED              : September 9, 2014
INVENTOR(S)        : Sungi Hong et al.

It is certified that error appears in the above-identified patent and that said Letters Patent is hereby corrected as shown below:

On the Title Page

Column 2, Line 4, Item [56] (Other Publications), Delete "Piscatwaway," and insert -- Piscataway, --, therefor.

Page 2, Column 1, Line 2, Item [56] (Other Publications), Delete "Unied" and insert -- United --, therefor.

Signed and Sealed this
Twenty-third Day of December, 2014

Michelle K. Lee
*Deputy Director of the United States Patent and Trademark Office*